(12) United States Patent
Burford

(10) Patent No.: US 8,579,180 B2
(45) Date of Patent: Nov. 12, 2013

(54) MANDREL TOOL PROBE FOR FRICTION STIR WELDING HAVING PHYSICALLY-SEPARATE SPIRALED SURFACES

(71) Applicant: Dwight A. Burford, Wichita, KS (US)

(72) Inventor: Dwight A. Burford, Wichita, KS (US)

( * ) Notice: Subject to any disclaimer, the term of this patent is extended or adjusted under 35 U.S.C. 154(b) by 0 days.

(21) Appl. No.: 13/623,590

(22) Filed: Sep. 20, 2012

(65) Prior Publication Data

US 2013/0075452 A1   Mar. 28, 2013

Related U.S. Application Data

(60) Provisional application No. 61/538,424, filed on Sep. 23, 2011.

(51) Int. Cl.
*B23K 20/12*   (2006.01)
*B23K 31/02*   (2006.01)

(52) U.S. Cl.
USPC .......................................... 228/2.1; 228/112.1

(58) Field of Classification Search
USPC ............... 228/112.1–114.5, 2.1–2.3
See application file for complete search history.

(56) References Cited

U.S. PATENT DOCUMENTS

| | | |
|---|---|---|
| 1,105,535 A | 7/1914 | Roberts |
| 1,108,059 A | 8/1914 | Zihler |
| 1,458,076 A | 6/1923 | Potts |
| 1,863,045 A | 6/1932 | Randall et al. |
| 1,863,046 A | 6/1932 | Githens et al. |
| 2,084,737 A | 6/1937 | Magnus |
| 7,152,509 B2 | 12/2006 | McCalley, Jr. et al. |
| 8,016,179 B2* | 9/2011 | Burford .................... 228/2.1 |
| 8,302,834 B2* | 11/2012 | Nelson et al. .............. 228/2.1 |
| 2006/0127180 A1* | 6/2006 | Hall et al. ................... 404/94 |
| 2006/0175382 A1* | 8/2006 | Packer et al. ............ 228/112.1 |
| 2008/0251571 A1* | 10/2008 | Burford .................. 228/114.5 |

FOREIGN PATENT DOCUMENTS

| | | | |
|---|---|---|---|
| DE | 4128028 A1 | 2/1993 | |
| JP | 10249551 A * | 9/1998 | ............ B23K 20/12 |
| JP | 2001071155 A * | 3/2001 | ............ B23K 20/12 |
| JP | 2001269779 A * | 10/2001 | ............ B23K 20/12 |
| JP | 2007054885 A * | 3/2007 | |
| JP | 2011235335 A * | 11/2011 | |
| JP | 2012020288 A * | 2/2012 | |
| WO | 02092273 A1 | 11/2002 | |
| WO | 2005061164 A1 | 7/2005 | |

OTHER PUBLICATIONS

English translation of JP 2001-71155, 2001.*

(Continued)

*Primary Examiner* — Kiley Stoner
*Assistant Examiner* — Carlos Gamino
(74) *Attorney, Agent, or Firm* — Smith Moore Leatherwood LLP

(57) ABSTRACT

A mandrel tool probe is provided for performing a friction-stir process. The mandrel tool probe includes a shank and a tip coupled to the shank, where the shank and tip are concentric and rotatable about a given axis. The tip includes a set of a plurality of physically-separate, spiraled surfaces each of which has a linear or curved cross-section that extends along a length of the tip at a constant or varying spiral angle around the circumference of the tip. The tip also has a cross-section with a constant shape along the length of the tip, with the cross-section of the tip including a plurality of major segments each of which is formed of the cross-section of a respective spiraled surface.

19 Claims, 21 Drawing Sheets

(56) References Cited

OTHER PUBLICATIONS

Craftsman 5 pc. Screw Extractor Set- Includes Screw Extractors No. 1-5—Tools—Hand Tools—Tap & Dies & Sets, Jun. 18, 2013, 5 pgs, retrieved from http://www.sears.com/craftsman-5-pc-screw-extractor-set-includes-screw/p-00966202000P?prdNo=8&blockType=G8[6/18/2013 4:59:18 PM].

Irwin 52409 #9 Easy Out Screw Extractor, Jun. 18, 2013, 2 pgs, retrieved from http://www.tools-plus.com/irwin-52409. html?utm_medium=feed&utm_source=froogle&utm_term=HAN52409&gclid=CMLP6enc4rcCFbFAMgodZD0AhQ [6/18/2013 4:58:33 PM].

Colegrove et al., Development of Trivex friction stir welding tool, Part 1—two dimensional flow modelling and experimental validation, Science and Technology of Welding and Joining, Institute of Materials, Jan. 1, 2004, pp. 345-361, vol. 9, No. 4, London, GB.

International Search Report and Written Opinion for International Appl. No. PCT/US2012/056345 mailed Jan. 9, 2013.

\* cited by examiner

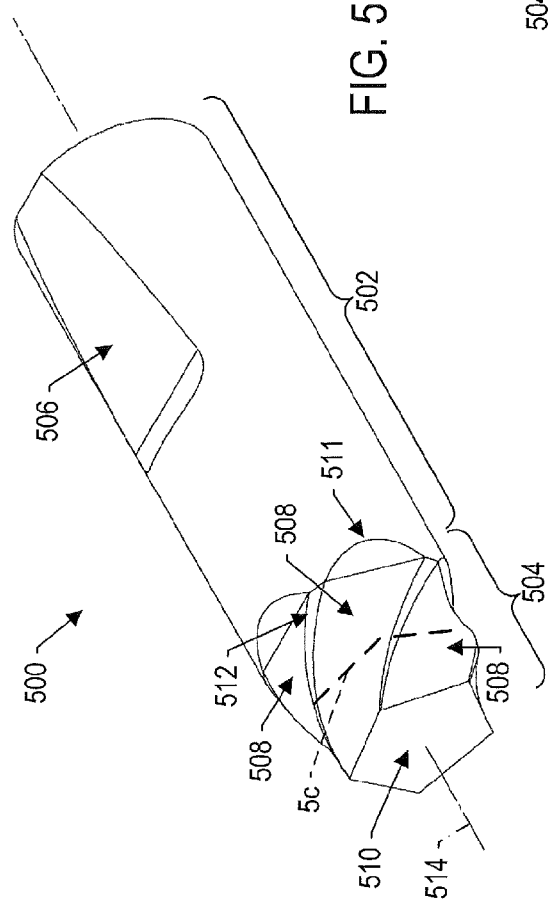
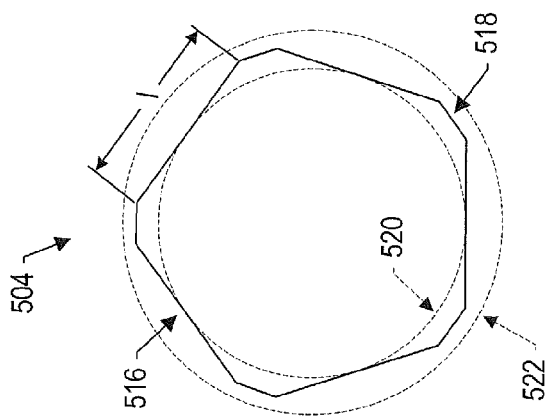
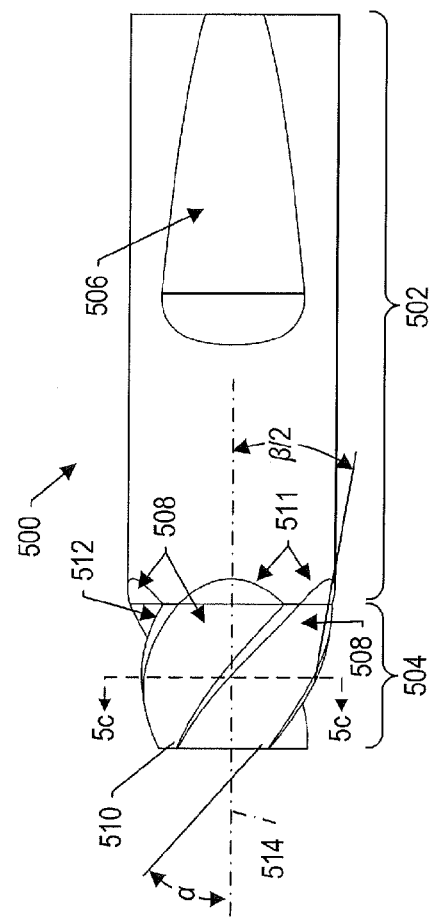
FIG. 5a
FIG. 5c
FIG. 5b

MANDREL TOOL PROBE FOR FRICTION STIR WELDING HAVING PHYSICALLY-SEPARATE SPIRALED SURFACES

CROSS-REFERENCE TO RELATED APPLICATION(S)

The present application is related to U.S. Provisional Patent Application No. 61/538,424, entitled: *Tool Probe for Friction Stir Welding*, filed on Sep. 23, 2011, the content of which is incorporated herein by reference in its entirety.

TECHNOLOGICAL FIELD

The present disclosure relates generally to non-consumable tools for friction stir welding and, more particularly, relates to tool probes and methods for forming joints between workpiece components by friction stir welding.

BACKGROUND

Friction stir welding is a solid-state (sub-solidus) joining process typically applied to metallic materials. It involves forcing a spinning, non-consumable tool into and along a joint between two or more workpieces to be permanently joined. A fully consolidated metallurgical joint may be formed between the workpieces as a result of the mechanical stirring and frictional heat introduced into the joint by the rotating, moving (traversing) tool. A conventional friction stir welding tool includes a shoulder and a probe that extends outwardly from the shoulder. During the FSW process, the probe is forced into the workpieces up to the shoulder and travels longitudinally along the joint interface (sometimes referred to as a faying surface) therebetween.

In full penetration welds, the probe provides through-thickness stirring of the joint interface to form a fully consolidated weld nugget or stir zone. The shoulder travels under force on the surface of the workpieces along the top edge of the joint interface, and provides both mechanical heating and containment of the workpiece material at the joint interface (at times referred to as "joint material") to keep it from escaping the stir zone. More information regarding conventional friction stir welding may be found in U.S. Pat. No. 5,460,317 to Thomas et al.; R. S. Mishra et al., *Friction Stir Welding and Processing*, 50 MATERIALS SCIENCE AND ENGINEERING R 1-78 (2005); and R. S. Mishra et al. (eds.), FRICTION STIR WELDING AND PROCESSING (2007), the contents of all of which are incorporated by reference in their entireties. Information regarding the conventional joining of different aluminum structural alloys in particular by friction stir welding may be found in P. L. Threadgill et al., *Friction Stir Welding of Aluminium Alloys*, 54 (no. 2) INTERNATIONAL MATERIALS REVIEWS (2009), the content of which is incorporated by reference in its entirety.

A friction stir welding tool may include an integral probe or, as shown in FIG. 1, a separate probe 100 that is insertable into the shoulder. As shown, the separate probe includes a shank and 102 and a tip 104. The shank may be held in the body of the weld tool with a set screw or bolt, which may be tightened against a whistle-notch 106 located in the shank. The tip is designed to extend outwardly from the shoulder, and it often includes threads 108 that are, in effect, small protruding geometric features. Different screw thread forms have been used in friction stir welding tools including, for example, unified threads, pipe threads, and power screw threads. As shown, the tip includes threads and a set of spiraled flats 110.

The tip 104 of the probe 100 often includes threads 108 as an effective and efficient means for moving material around and along the tip. However, threads tend to break ("shed") with use during the FSW process, leaving small fragments of the probe in the joint material and rendering the probe less effective. Threaded tool probes are particularly susceptible to thread breakage at the end 112 of the probe tip 104 opposite the shank 102 because partial threads 104a are present at this location. Even when a chamfer is machined into the end of the probe, the threads become partial threads at this location and are prone to breakage (especially during the plunging phase of a typical FSW cycle).

The threads 108 of a tool probe 100 also tend to constrain the joint material to flow around the tool probe in a spiral path, which is imposed on the material by the spiral nature of threads. As such, the joint material is engaged by the strong auguring motion of the threads. Given the relatively high rotational speeds of the probe, threads may be stripped similar to when the threads of a nut get stripped out by over-tightening. Shavings of parent material produced in this way must be recombined to form a solid joint in the wake of the tool, especially in high-strength aluminum alloys. The result is a relatively large content of interfaces in the recombined material behind the probe in the stir zone.

Therefore, it may be desirable to have a tool probe designed to more efficiently move material front to back of the probe as it rotates and advances during a FSW process, while providing sufficient heat, pressure and relative translation of the joint material from each workpiece being joined without the use of threads or serrations.

BRIEF SUMMARY

Example embodiments of the present disclosure are generally directed to a mandrel tool probe that includes spiraled surfaces instead of threads, grooves, channels or the like, and which may promote better material flow around the tool probe in FSW processes. The mandrel tool probe of example embodiments may promote better mixing and produce an increase in the size of the thermal mechanical zone (TMAZ) adjacent to the stir zone (nugget) when compared to the TMAZ produced by a similar-sized conventional threaded tool probe. An increase in the size of the stir zone may also be expected to enhance other similar welding processes such as friction stir processing (FSP), friction stir spot welding (FSSP) or the like.

According to one example aspect, a mandrel tool probe is provided for performing a friction-stir process. The mandrel tool probe includes a shank and a tip coupled to the shank, where the shank and tip are concentric and rotatable about a given axis. The tip may be free of threads, and includes a set of a plurality of physically-separate, spiraled surfaces. For example, the set of spiraled surfaces may include between three and nine spiraled surfaces. Each of the spiraled surfaces has a linear or curved cross-section that extends along a length of the tip at a constant or varying spiral angle around the circumference of the tip. The tip also has a cross-section with a constant shape along the length of the tip, with the cross-section of the tip including a plurality of major segments each of which is formed of the cross-section of a respective spiraled surface.

In one example, the major segments of each cross-section of the tip along the length of the tip are coplanar lying in a plane that is normal to the given axis.

In one example, the major segments of any cross-section of the tip along the length of the tip have the same or approximately the same length. In this example, the major segments from one cross-section of the tip to another cross-section of the tip along the length of the tip may have varying lengths.

In one example, the tip may be tapered, and a size of the cross-section of the tip may vary along the length of the tip based on the taper.

In one example, the spiraled surfaces may be separated by ridges, edges or land areas between adjacent spiraled surfaces. In this example, each of the ridges, edges or land areas may extend along the length of the tip at a constant or varying spiral angle around the circumference of the tip.

And in one example, the spiraled surfaces may be separated by land areas between adjacent spiraled surfaces. In this example, the land areas may include intermediate geometric features that include tapered flats, or neutral, spiraling and/or counter-spiraling channels.

According to another example aspect, a tool including a probe similar to that described above is provided for performing a friction-stir process. The features, functions and advantages discussed herein may be achieved independently in various example embodiments or may be combined in yet other example embodiments, further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

FIG. 5 (including FIGS. 5a, 5b and 5c) illustrates a mandrel tool probe according to one example embodiment of the present disclosure;

Figure 1:
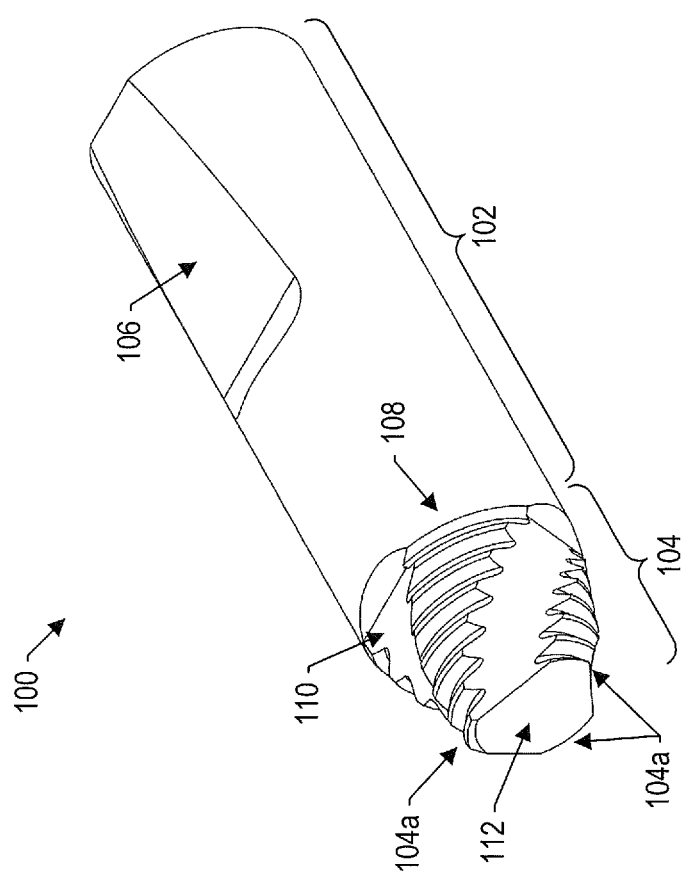
FIG. 1 illustrates a threaded tool probe according to the prior art.
Figure 3:
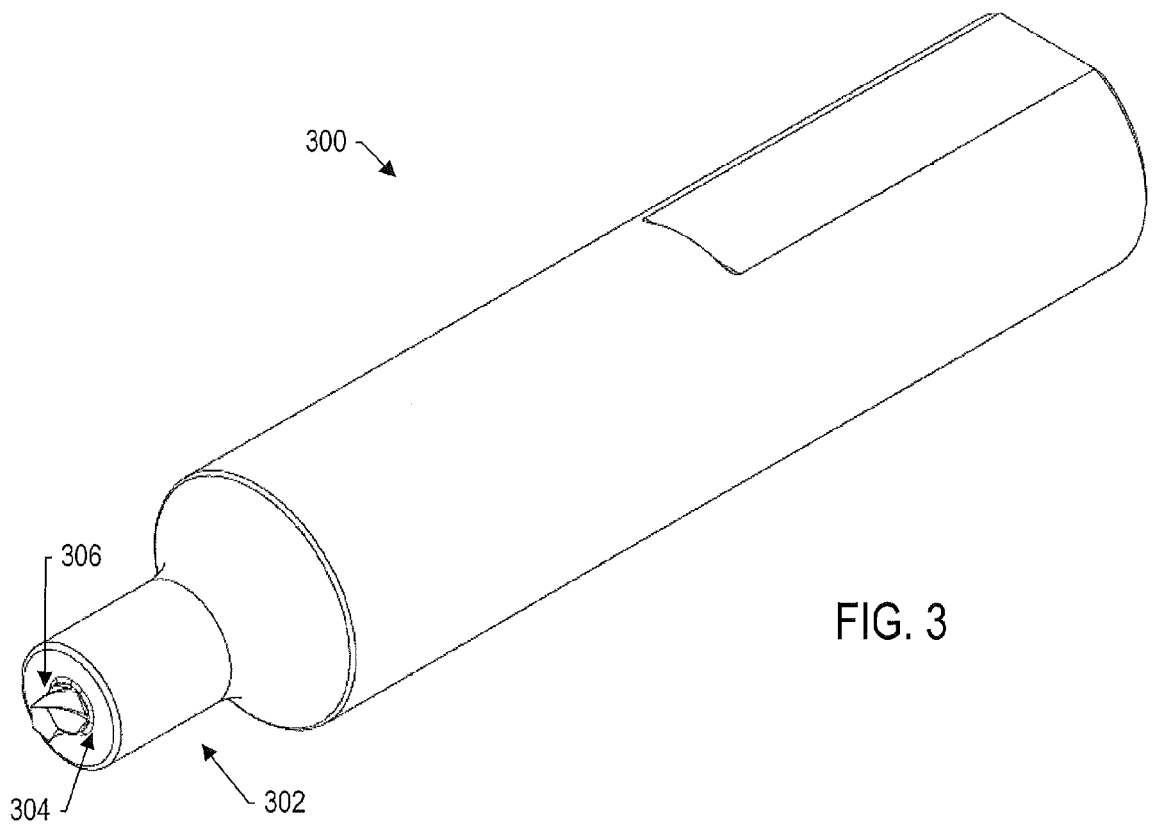
FIG. 3 illustrates a single-piece FSW tool including a mandrel tool probe according to one example embodiment of the present disclosure.
Figure 4A:
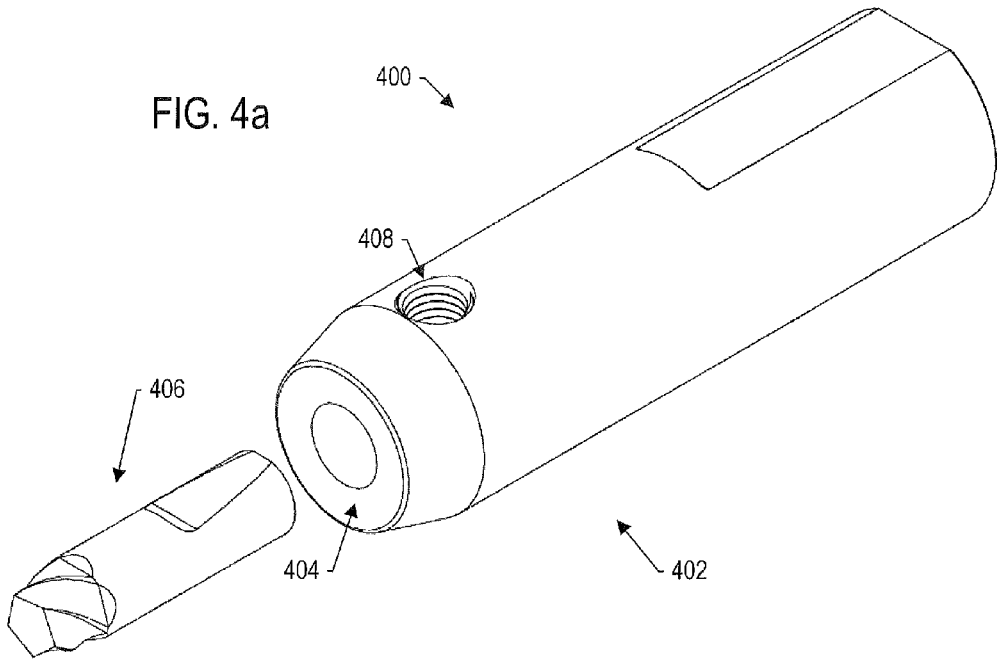
FIG. 4 (including FIGS. 4a and 4b) illustrate a multi-piece FSW tool including a mandrel tool probe according to one example embodiment of the present disclosure.
Figure 4B:
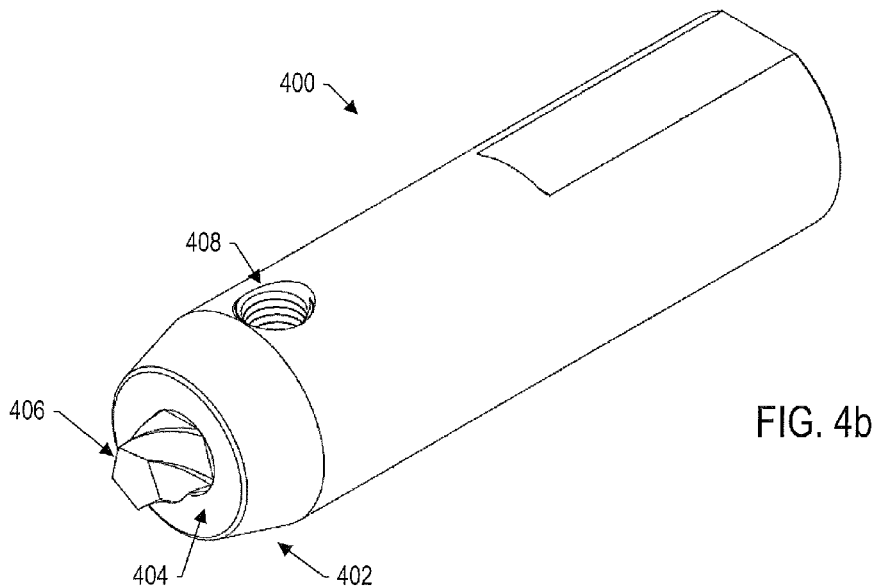
Figure 8:
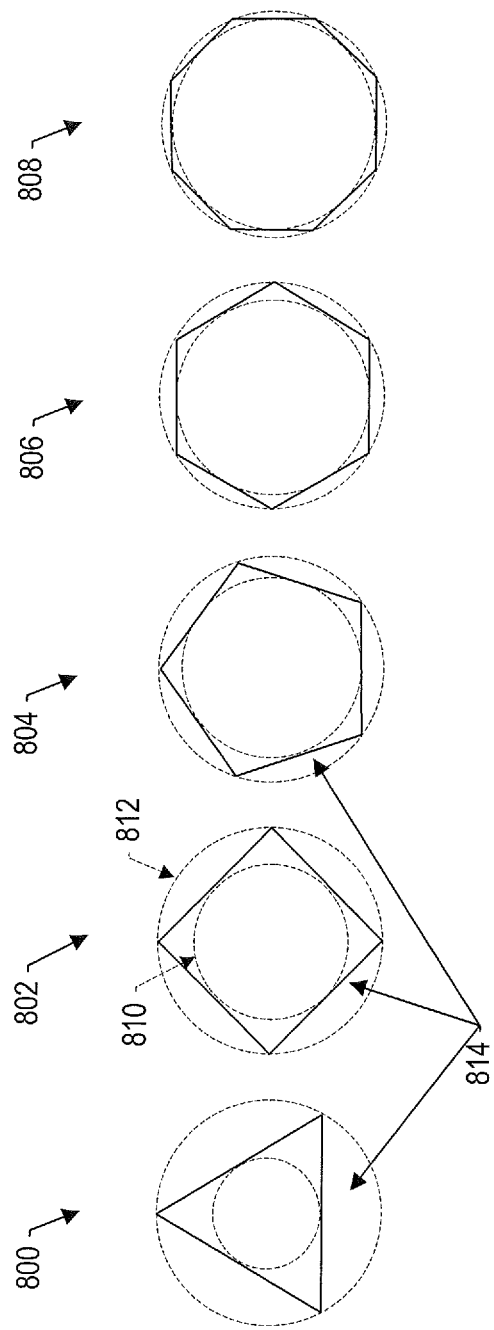
Figure 10:
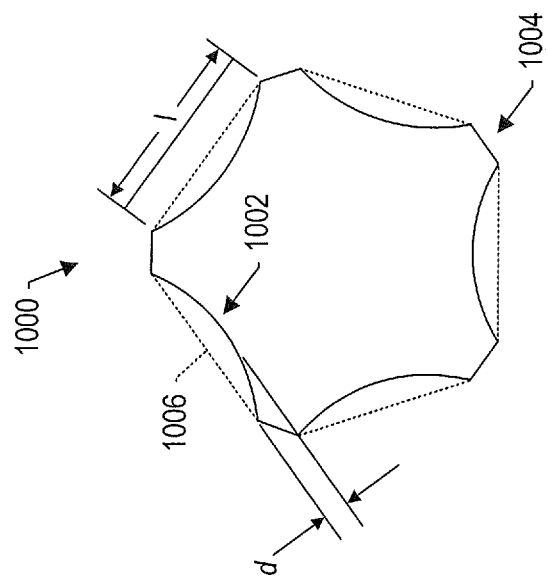
Figure 9:
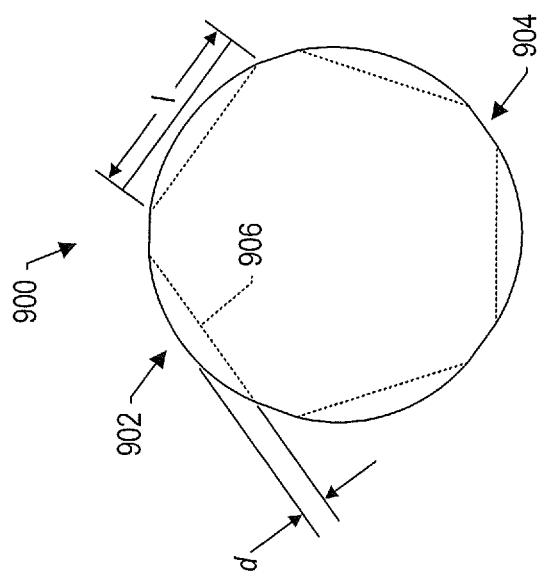
Figure 11B:
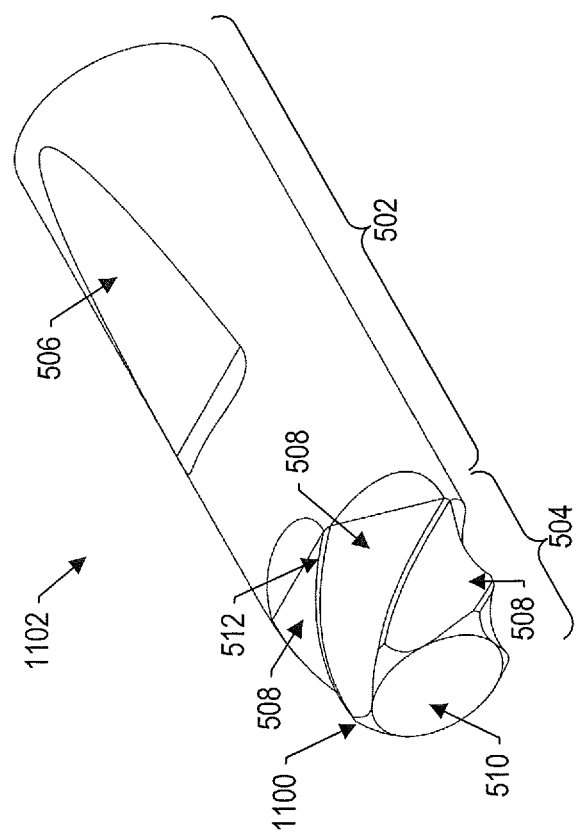
Figure 11A:
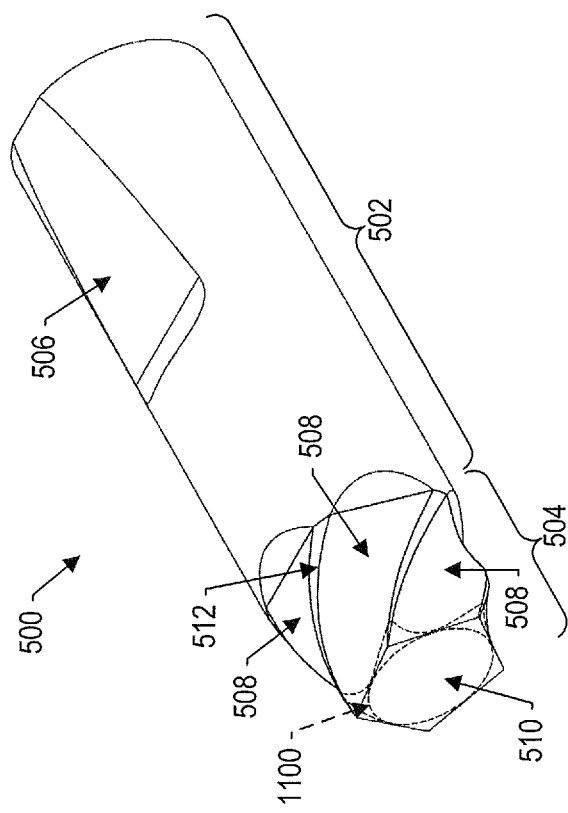
Figure 13:
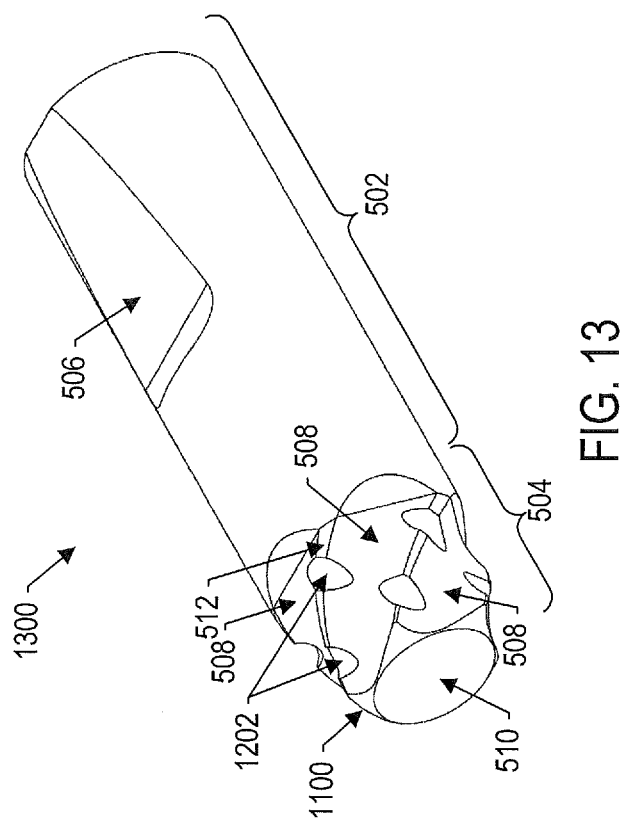
Figure 12:
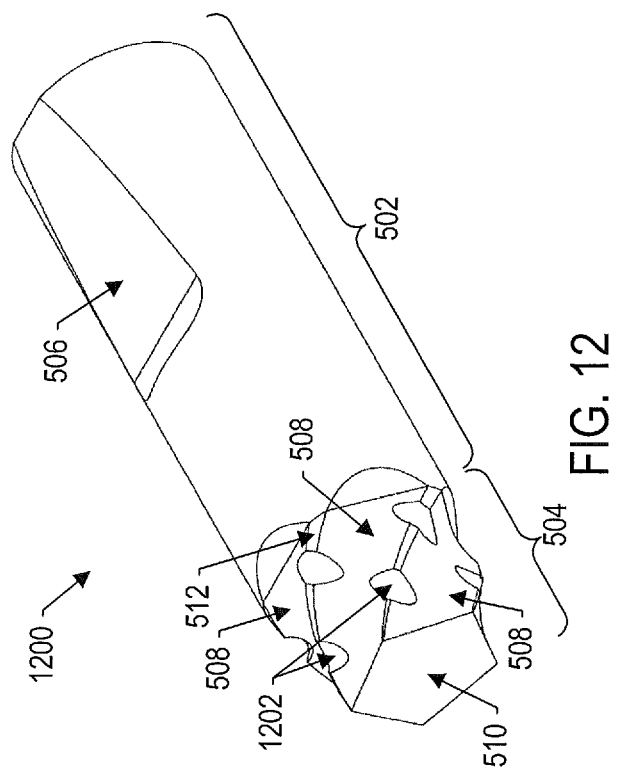
Figure 14:
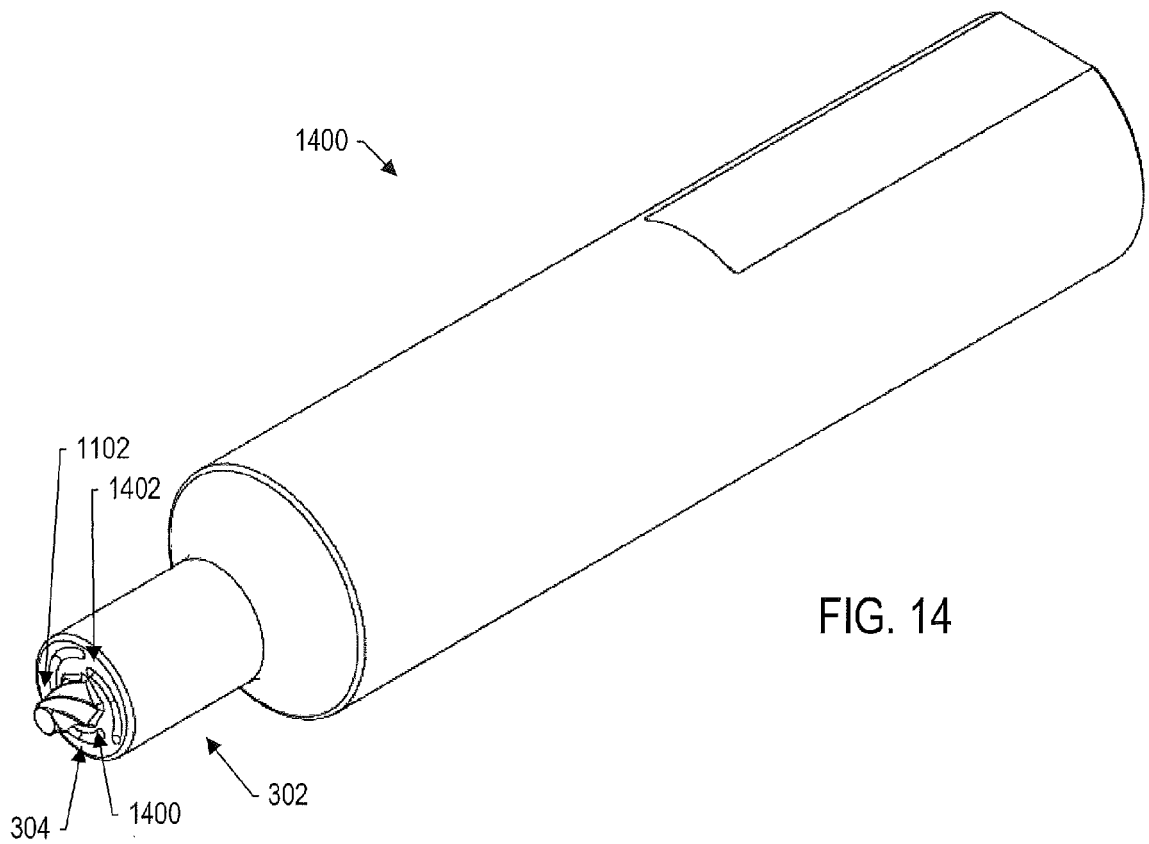
Figure 15:
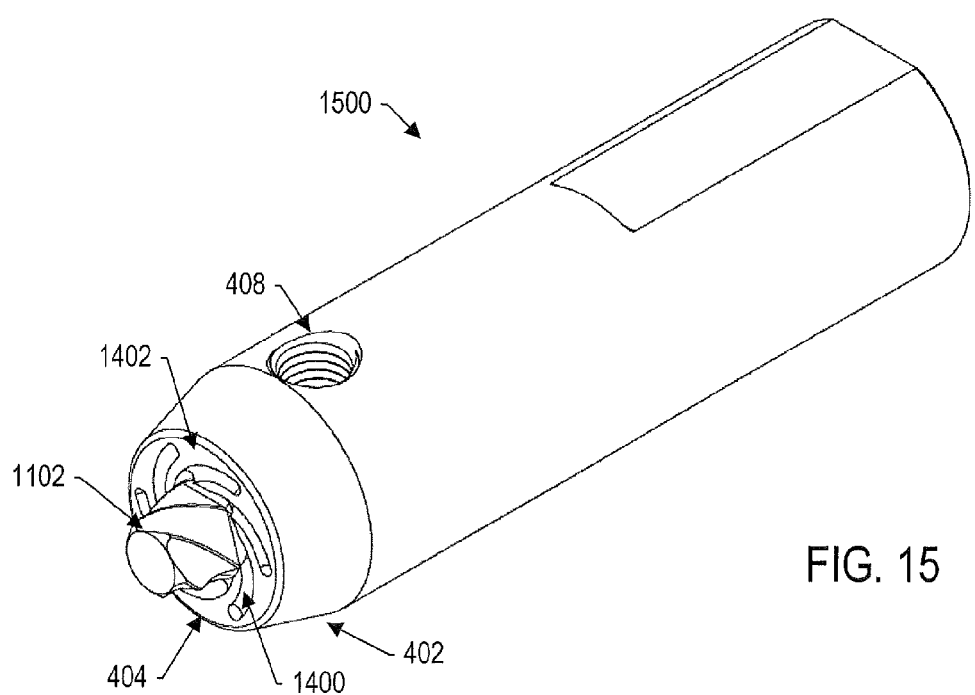
Figure 25:
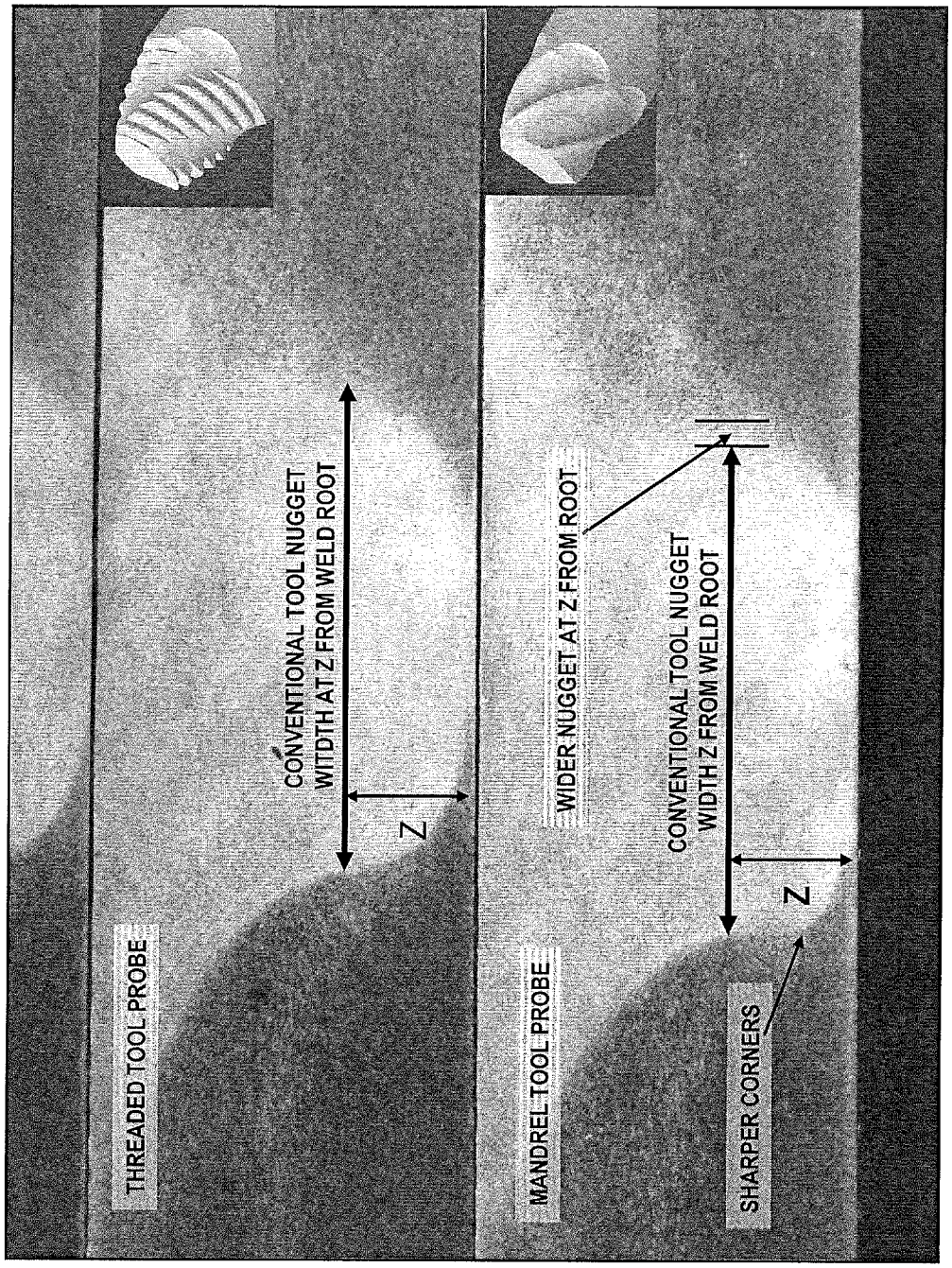
Figure 26:
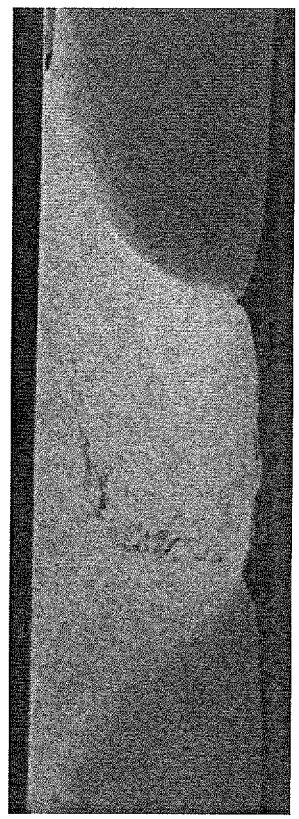
Figure 27:
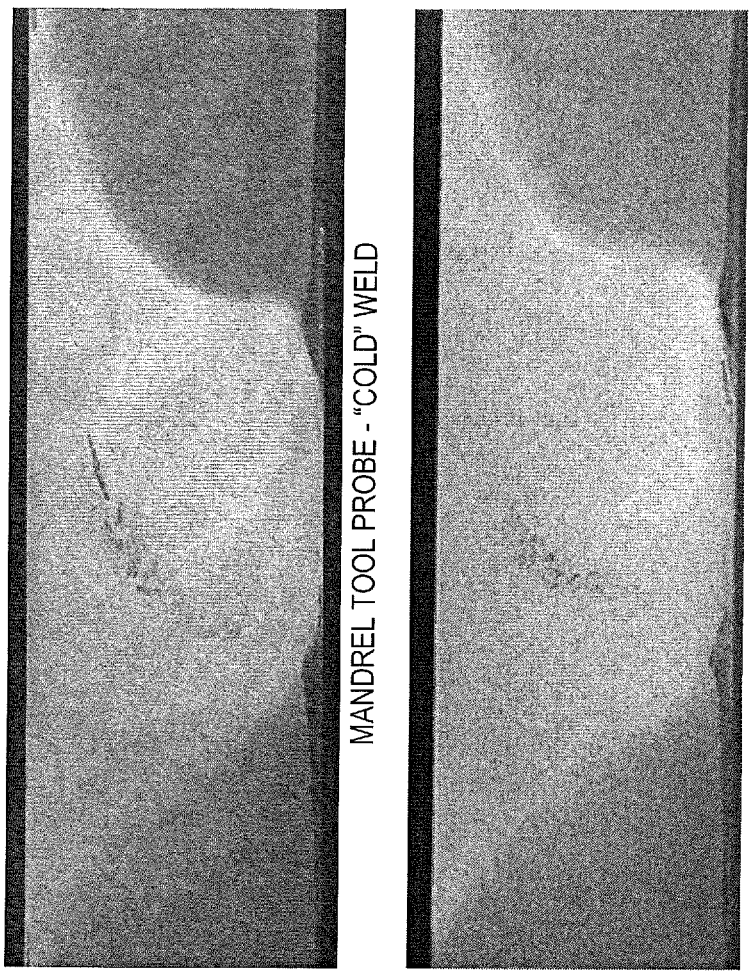

FIG. 8 generally illustrates various cross-sections of example probe tips according to example embodiments;

FIGS. 9 and 10 illustrate cross-sections of examples in which spiraled surfaces of a mandrel tool probe have either a convex or concave curved shape, according to example embodiments;

FIG. 11 (including FIGS. 11a and 11b) illustrates a mandrel tool probe similar to that of FIG. 3 but including a chamfer machined into its end, according to one example embodiment;

FIGS. 12 and 13 illustrate mandrel tool probes similar to those of respective ones of FIGS. 3 and 11, but further including one or more counter-spiraling channels according to one example embodiment;

FIGS. 14 and 15 illustrate single- and multi-piece FSW tools similar to those of respective ones of FIGS. 3 and 4, but further including scroll patterns machined into their shoulders according to one example embodiment;

FIGS. 16-24 illustrate other mandrel tool probes according to example embodiments;

FIG. 25 illustrates cross-sections of welds produced with a threaded tool probe such as that of FIG. 1, and a mandrel tool probe such as that of FIG. 5; and FIGS. 26 and 27 illustrate a cross-section of a weld produced with a threaded tool probe such as that of FIG. 1, and a mandrel tool probe such as that of FIG. 5, respectively.

DETAILED DESCRIPTION

Some example embodiments of the present disclosure will now be described more fully hereinafter with reference to the accompanying drawings, in which some, but not all embodiments of the disclosure are shown. Indeed, various example embodiments of the disclosure may be embodied in many different forms and should not be construed as limited to the example embodiments set forth herein; rather, these example embodiments are provided so that this disclosure will be thorough and complete, and will fully convey the scope of the disclosure to those skilled in the art. Like reference numerals refer to like elements throughout.

Figure 2A:
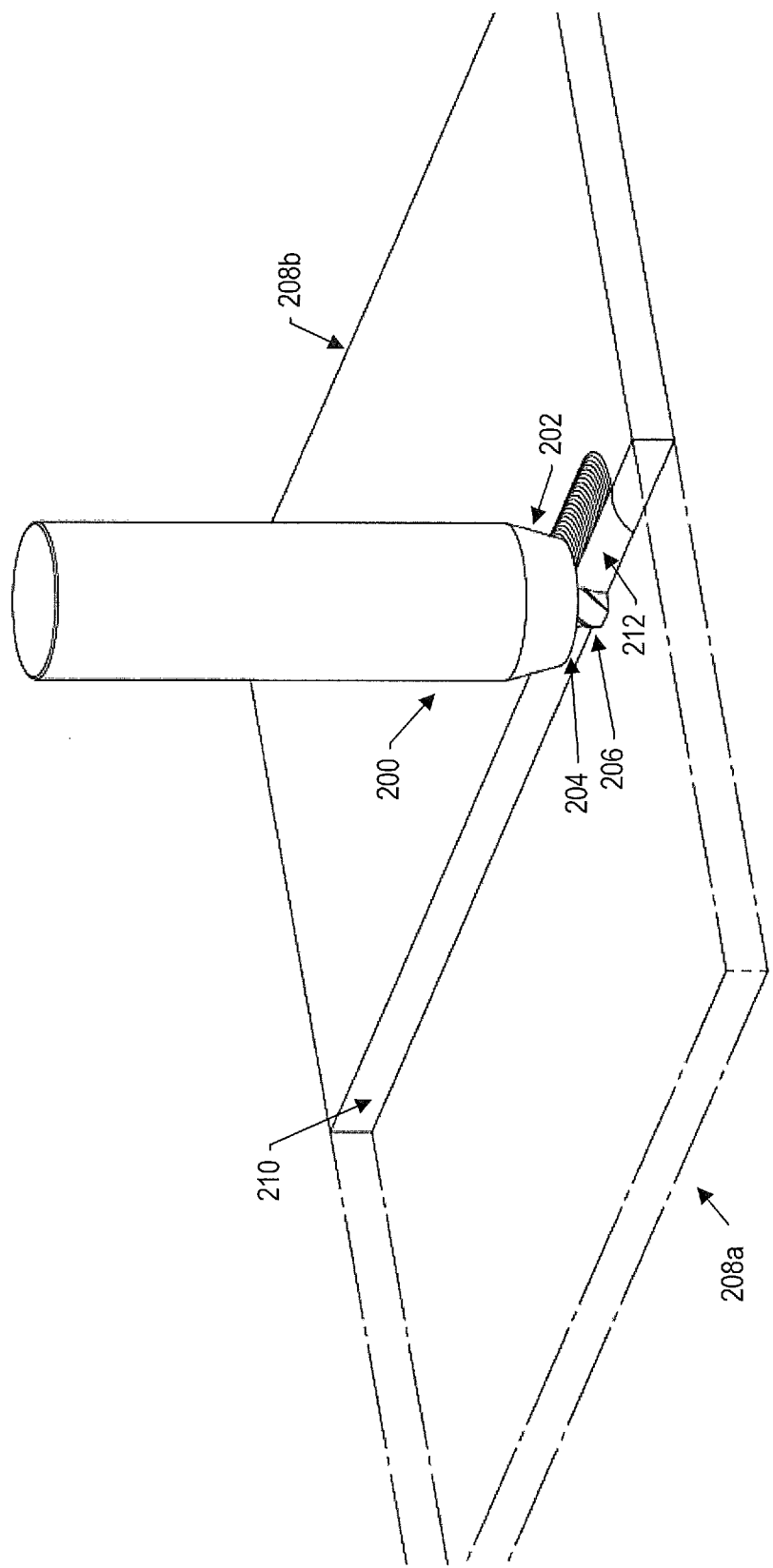
FIG. 2 (including FIGS. 2a and 2b) illustrates a basic friction stir welding (FSW) tool and FSW process that may benefit from the mandrel tool probe of example embodiments of the present disclosure.
Figure 2B:
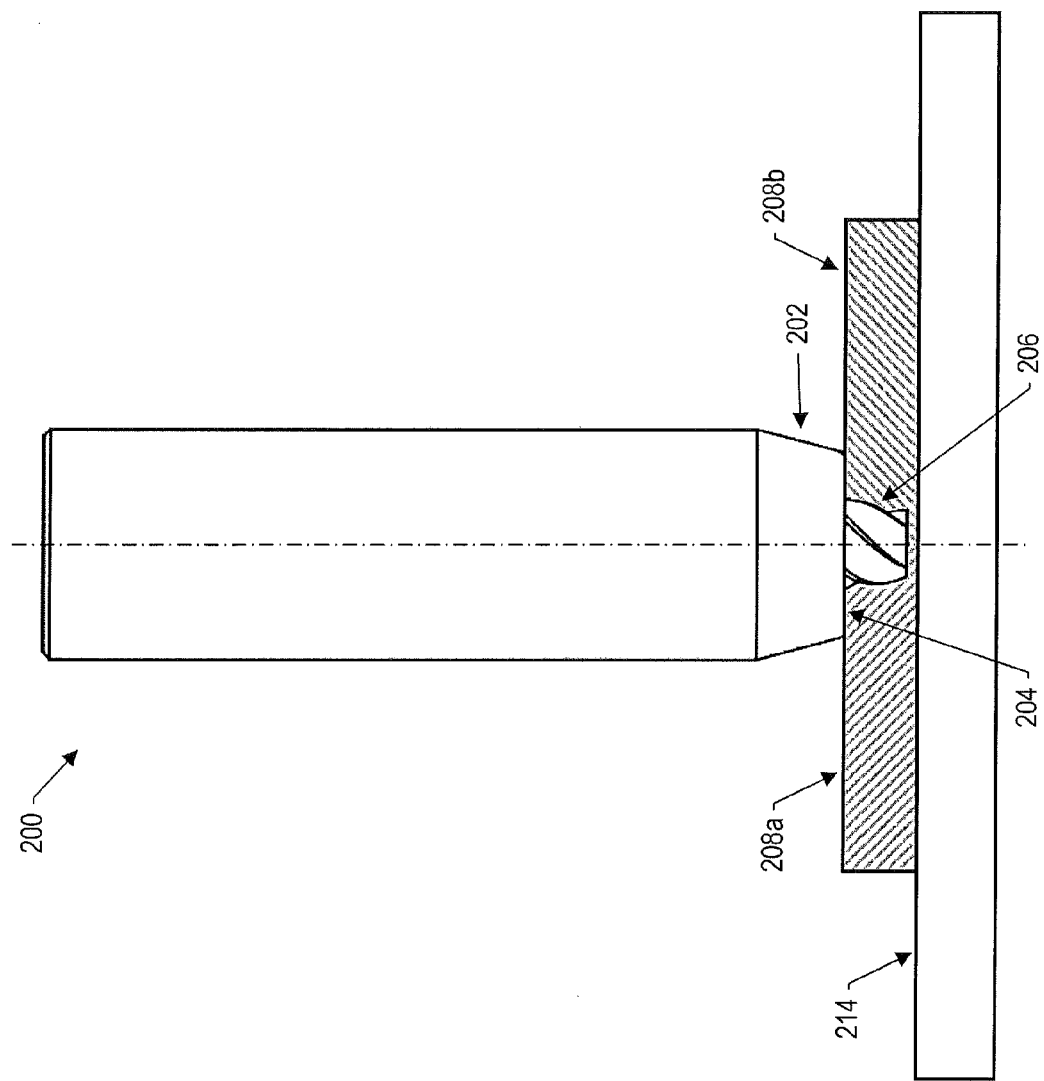

Example embodiments of the present disclosure are directed to a friction stir welding (FSW) weld tool probe referred to herein as a mandrel tool probe. FIG. 2 (including FIGS. 2a and 2b) illustrates a basic FSW tool and FSW process that may benefit from the mandrel tool probe of example embodiments. FIG. 2 illustrates the process used to fabricate a butt joint between two workpieces. It should be understood, however, that the mandrel tool probe of example embodiments may be applicable to any of a number of other FSW processes including, for example, lap-type welding, spot-type welding, self-reacting or the like. Likewise, the mandrel tool probe may be applicable to not only FSW processes but also to other similar friction-stir processes such as friction stir processing (FSP), friction stir spot welding (FSSP) or the like.

As shown in FIG. 2, the FSW tool 200 includes a support body 202 having a shoulder 204 at its distal end, and a probe 206 that extends outwardly from the shoulder. The support body, shoulder and probe may be concentric and rotatable about a given axis. A weld cycle of a FSW process may include spinning or rotating the FSW tool, and while the tool spins, slowly plunging its probe into the workpieces 208a, 208b until the shoulder contacts the surface of the workpiece. In one example, the probe may be plunged into a starting location on a joint interface 210 (sometimes referred to as a faying surface) between the workpieces. In another example, the probe may be plunged into an end of the workpieces along a direction of travel. In either example, the workpieces may be preheated to avoid breaking the probe.

Immediately after plunging the probe 206 into the workpieces 208a, 208b, or after a short dwell time, the FSW tool 200 may be advanced or otherwise traversed longitudinally along the joint interface 210 in the direction of travel. The FSW tool may be advanced under either constant tool axial load or under fixed axial position control, both of which may be controlled through actuation of a machine tool spindle on which the weld tool may be mounted.

During the weld cycle of the FSW process, the shoulder 204 and probe 206 may provide the necessary work surfaces for stirring and containing the workpiece material. That is, the probe may generally provide through-thickness stirring of the workpiece material at the joint interface 210 (at times referred to as "joint material") to form a fully consolidated stir zone 212. The shoulder may travel under force on the surface of the workpieces 208a, 208b along the top edge of the joint interface, and provide both mechanical (both friction and stirring) heating and containment of the joint material to keep it from escaping the stir zone. At the completion of the weld cycle, the probe may be extracted from the workpiece, typically while the FSW tool continues to spin.

The rotating and compacting motion of the shoulder 204 and probe 206 on the workpieces 208a, 208b may introduce three necessary elements to produce a sound friction weld, namely, heat, pressure and relative translation of the adjoining workpiece materials. The heat necessary for plastically straining the joint material around the FSW tool probe may be generated in the workpieces under the shoulder and immediately surrounding the probe through mechanical stirring and frictional heating. The pressure to form a fully consolidated joint may be provided by the shoulder, which may compress the joint material against a supporting backing surface 214, as shown in FIG. 2b. Relative translation between the workpieces being joined may be provided through the locally complex forging and extruding action induced in the joint material by the spinning, advancing shoulder and probe. Through the simultaneous application of these processes, a metallic bond may be established between the workpieces in the stir zone 212 without melting the joint material of the workpieces.

Process parameters for FSW processes may depend on the metal alloys and thicknesses being joined, as well as the joint configuration and weld tool geometry selected for joining the workpieces 208a, 208b. Primary process parameters may include: 1) spindle rotational speed, 2) FSW tool 200 travel speed, and 3) axial FSW tool force (shoulder pressure) or location (displacement control). Sufficient joint fit-up and part rigidity may also be required to ensure that the parts do not shift under the application of the high loads often involved in FSW processes.

The FSW tool 200 may be made in a single-piece or multi-piece design. FIG. 3 more particularly illustrates a single-piece FSW tool 300, and FIG. 4 (including FIGS. 4a and 4b) more particularly illustrates a multi-piece FSW tool 400 according to example embodiments. A single-piece design includes a body 302 having a shoulder 304 at its distal end, and an integral probe 306 that extends outwardly from the shoulder. In the single-piece design, the body and integral probe are fabricated from the same piece of tool material. The single-piece design is typically used for smaller tools used to join thin workpieces.

The multi-piece FSW tool 400 also includes a body 402 having a shoulder 404 at its distal end, and a probe 406 that extends outwardly from the shoulder. But in the multi-piece design, the probe may be inserted into a hole defined in the shoulder of the body, which may also define a threaded hole 408 for receiving a set screw to hold the inserted probe in place. In the multi-piece design, the body and probe may be fabricated from different material, which may facilitate its use in larger tools in which each component may have different service requirements. In a multi-piece design, for example, the body may be fabricated to include a shoulder that may withstand wear on the surface of the workpiece, whereas the probe may be fabricated to withstand rotating bending fatigue at the elevated welding temperatures within the workpiece. The mandrel tool probe of example embodiments may be used in both single and multi-piece tool designs.

As explained in the background section, the tip 104 (FIG. 1) of a conventional tool probe 100 may include threads 108 that may facilitate movement of material around and along the tip. These threads, however, tend to break or may be stripped with use in FSW processes. As explained in greater detail below, the mandrel tool of example embodiments may be generally free of threads. The mandrel tool may more efficiently move material front to back of probe as it rotates and advances during a FSW process, while providing sufficient heat, pressure and relative translation of the joint material from each workpiece being joined without the use of threads or serrations.

Again with reference to FIGS. 3 and 4, the mandrel tool probe of example embodiments may be integral with a FSW tool as in a single-piece design, or separate from the FSW tool as in a multi-piece design. As suggested above, factors such as cost of manufacturing and tool life may affect a decision to use a single-piece or multi-piece design. In a multi-piece design, a broken probe may be more easily replaced than remanufacturing the entire tool for a single-piece design. In either instance, the FSW tool may include a shoulder at its distal end, and include the mandrel tool probe extending outwardly from the shoulder.

FIG. 5 (including FIGS. 5a, 5b and 5c) illustrates one example of a separate mandrel tool probe 500 that may be insertable into the shoulder of a FSW tool (see, e.g., FIG. 4), in accordance with example embodiments of the present disclosure. More particularly, FIGS. 5a and 5b illustrate perspective and side views, respectively; and FIG. 5c illustrates a transverse cross-section view.

As shown in FIG. 5, the mandrel tool probe 500 includes a shank 502 and a tip 504 coupled to the shank. Similar to the shank 102 of the conventional probe 100, the shank of the mandrel tool probe may be held in the body of a weld tool with a set screw or bolt, which may be tightened against a whistle-notch 506 located in the shank. The tip is designed to extend outwardly from the shoulder. In contrast to the threads 108 (FIG. 1) of the conventional probe, the tip 504 of the mandrel tool probe may include a set of a plurality of physically-separate, spiraled surfaces 508 located on its outer periphery.

A set of spiraled surfaces 508 may be defined as a plurality of similar geometric features each of which has a linear or curved cross-section that extends along the length of the probe tip 504 at a constant or varying spiral (helical) angle around the circumference of the tip. As described herein, spiraled surfaces having a linear cross-section may be referred to as "flats." Aspects of example embodiments may be particularly described with respect to these flats, but it should be understood that unless otherwise stated, those aspects may equally apply to spiraled surfaces having either a linear or a curved cross-section.

In one example, the spiraled surfaces may extend from the end 510 of the probe tip 504 opposite the shank 502 and terminate before or at the shank, such as with a blend or transition radius 511, which may eliminate a sharp edge otherwise formed by an abrupt termination of the spiraled surfaces at the shank The blend or transition radius may also reduce the stress concentration at this location on the probe to reduce the likelihood of fatigue failures, which may thereby increase the life of the tool probe by reducing the likelihood of tool breakage. Including a runoff transition of the flats onto the probe shank may also improve the manufacturability of the tool.

The number of spiraled surfaces 508 in the set of spiraled surfaces may be selected in a number of different manners, such as to optimize the overall FSW process for optimal joint properties of a given workpiece material and thickness. The mandrel tool probe shown in FIG. 5 includes a set of five spiraled surfaces, although the mandrel tool may include a lesser or greater number of spiraled surfaces, such as between three and nine spiraled surfaces. The greater the number of spiraled surfaces, the less material each spiraled surface may be able to carry or move around the tool as the tool is spun and traversed through the workpiece for a given surface shape. Also, as the number of spiraled surfaces increases, the mandrel tool probe may approach the shape of a smooth cone. Conversely, selecting fewer spiraled surfaces may reduce the core diameter of the probe, making it potentially weaker, thus reducing tool life. Thus, in one example, an optimum number of spiraled surfaces may be identified for a given joint thickness and the material being joined.

According to some example embodiments, the spiraled surfaces 508 may be separated by ridges, edges or land areas 512 between adjacent spiraled surfaces, with each ridge extending along the length of the probe tip 504 at a constant or varying spiral angle around the probe circumference. Similar to the spiraled surfaces, the land areas may each have a linear or curved cross-section that may be a fraction of the width of the spiraled surface (e.g., less than 10% of the width), which need not have serrated features such as threads. The width of the land area, when present, may be constant or may taper or vary in size. Or in some example embodiments, the land areas may include intermediate geometric features that may enhance material flow immediately around the probe 500. These intermediate geometric features may include tapered flats, or neutral, spiraling or counter-spiraling channels, or the like. Examples of suitable intermediate geometric features are described in U.S. Pat. No. 7,942,306 to Burford, the content of which is hereby incorporated by reference in its entirety.

As shown in FIG. 5b, the spiral angle a of the spiraled surface 508 may be defined relative to the mandrel tool probe axis 514. Any of a number of different spiral angles may be selected, such as based on the material being welded and the geometry of the joint. In one example, the spiral angle may range between 15 and 75 degrees, or more particularly in a further example, between 30 and 60 degrees. And in an even further, more specific example, a spiral angle of 45 degrees may be selected. In one example, the mandrel tool probe 500 may include a set of either five or seven spiraled surfaces nominally oriented at 45 degrees to the probe axis ($\alpha=45°$).

As also shown in FIG. 5b, the probe tip 504 may be tapered by an included angle β. This may lessen the bending moment on the probe during friction stir welding and promote vertical movement of the workpiece material away from the tool shoulder during friction stir welding. Any of a number of different taper angles may be selected, such as based on workpiece material and thickness. In one example, the taper angle may range between an included angle of 10 to 40 degrees, but the included angle may range from 0 to 90 degrees (e.g., β/2—half the angle—may range from 5 to 20 degrees, or more broadly, from 0—straight—to 45 degrees—for a right angle tilted 45 degrees to the tool axis 514). And in even further, more specific examples, a taper angle of 20 to 30 degrees may be selected (allowing β/2 to range between 10 to 15 degrees).

In examples in which the probe tip 504 is tapered, the depth of spiraled surfaces 508 may increase from the end 510 of the probe tip 504 to where they terminate at the probe shank 502 due to the taper. The probe 500 may have a depth determined by selecting the width and number of spiraled surfaces, as well as the relative spacing between the spiraled surfaces.

Figure 6B:
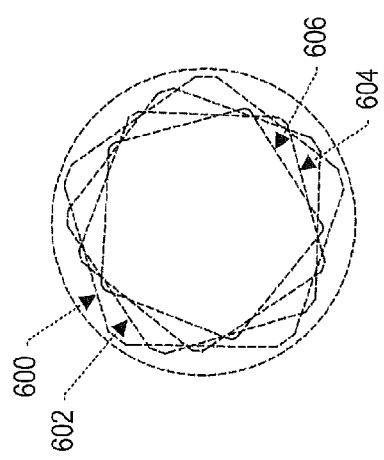
FIG. 6 (including FIGS. 6a, 6b and 6c) illustrate example cross-sections of the mandrel tool probe of FIG. 5, according to one example embodiment.
Figure 6A:
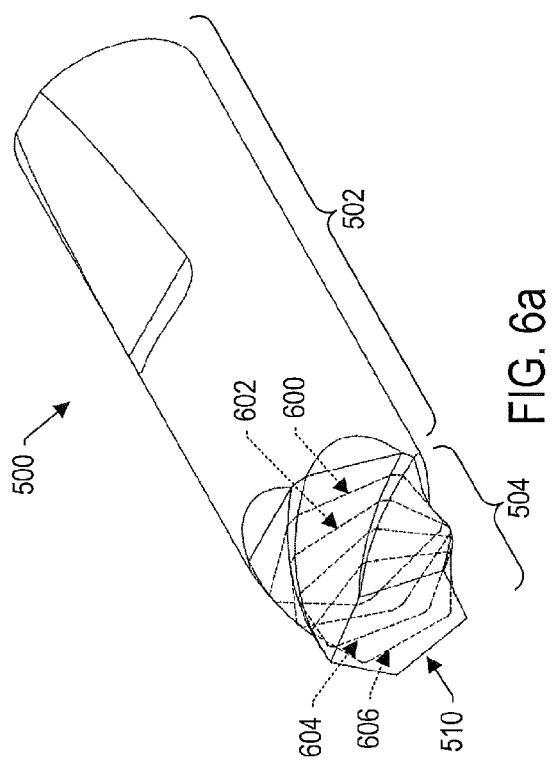
Figure 6C:
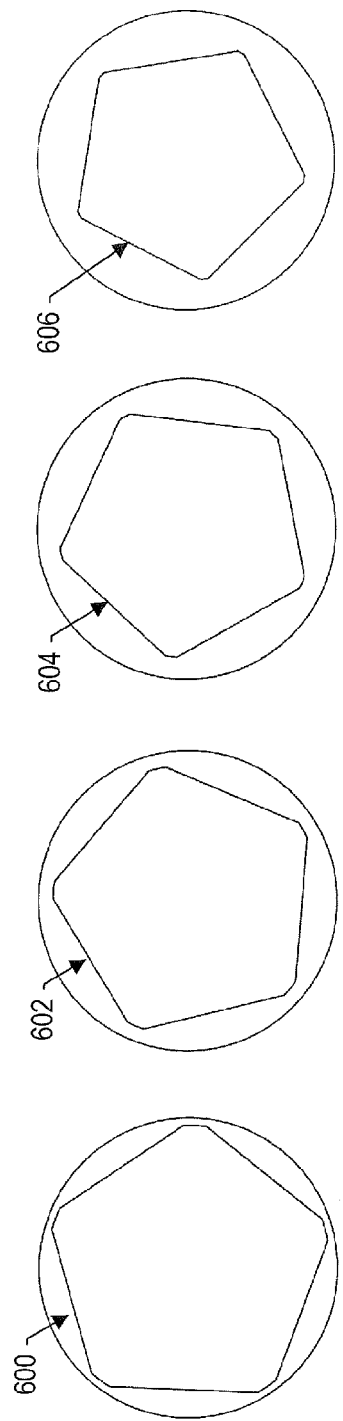

As shown in FIG. 5c, and more particularly with reference to FIG. 6, the probe tip 504 may have a cross-section with a constant shape along the length of the tip, which may be revealed by the end 510 of the tip and may be retained along its length, as shown in FIG. 6 (including FIGS. 6a, 6b and 6c).

FIG. 6 illustrates the probe 500 and four example cross-sections 600, 602, 604 and 606 along its tip 504. As shown, the shape of the cross-section may be retained along the length of the tip, but may appear to rotate along the length due to the spiraled nature of the spiraled surfaces 508. FIG. 6b illustrates the example cross-sections overlaid on one another, and FIG. 6c illustrates the cross-sections separated from one another.

Turning back to FIG. 5c, the cross-section of the tip 504 may include a plurality of interconnected major segments 516 formed of the cross-sections of respective ones of the spiraled surfaces 508 in the set of spiraled surfaces. The major segments may be directly interconnected, or in various examples, interconnected via minor segments 518 formed of the cross-sections of respective ones of the land areas 512 between adjacent spiraled surfaces. The segments may be located between a core diameter 520 (the largest diameter around the tool axis 514 at a given location along the probe length that is fully contained within the tool material) and a swept diameter 522 (the largest diameter that the tool features swing around the tool axis) of the probe 500. The number of major segments, and thus the number of spiraled surfaces, may generally define the shape of the cross-section. For example, the major segments of a three-surface tip may generally define a triangular shape. The major segments of a four-surface through nine-surface tip may generally define respective ones of a rectangular shape, pentagonal shape (shown), hexagonal shape, heptagonal shape, octagonal shape or nonagonal shape.

As indicated above, each of the spiraled surfaces 508 may have a linear or curved cross-section; and correspondingly, each of the major segments 516 may be linear or curved. As shown in FIGS. 5c and 6, the major segments are linear, and in this instance, the spiraled surface may be referred to as a spiraled flat or simply a flat. The major segments of any cross-section along the length of the probe tip 504 may have the same or approximately the same length l, and thus, the cross-sections of the curved surfaces at any point along the length of the probe tip may have the same or approximately the same respective length. For a tapered probe tip, the length of the major segments may vary from cross-section to cross-section along the length of the tip 504 based on the taper. In such instances, although the shape of the cross-section of the probe tip 504 may be constant along the length of the tip, the size of the cross-section may vary along the length based on the taper of the probe tip.

Figure 7:
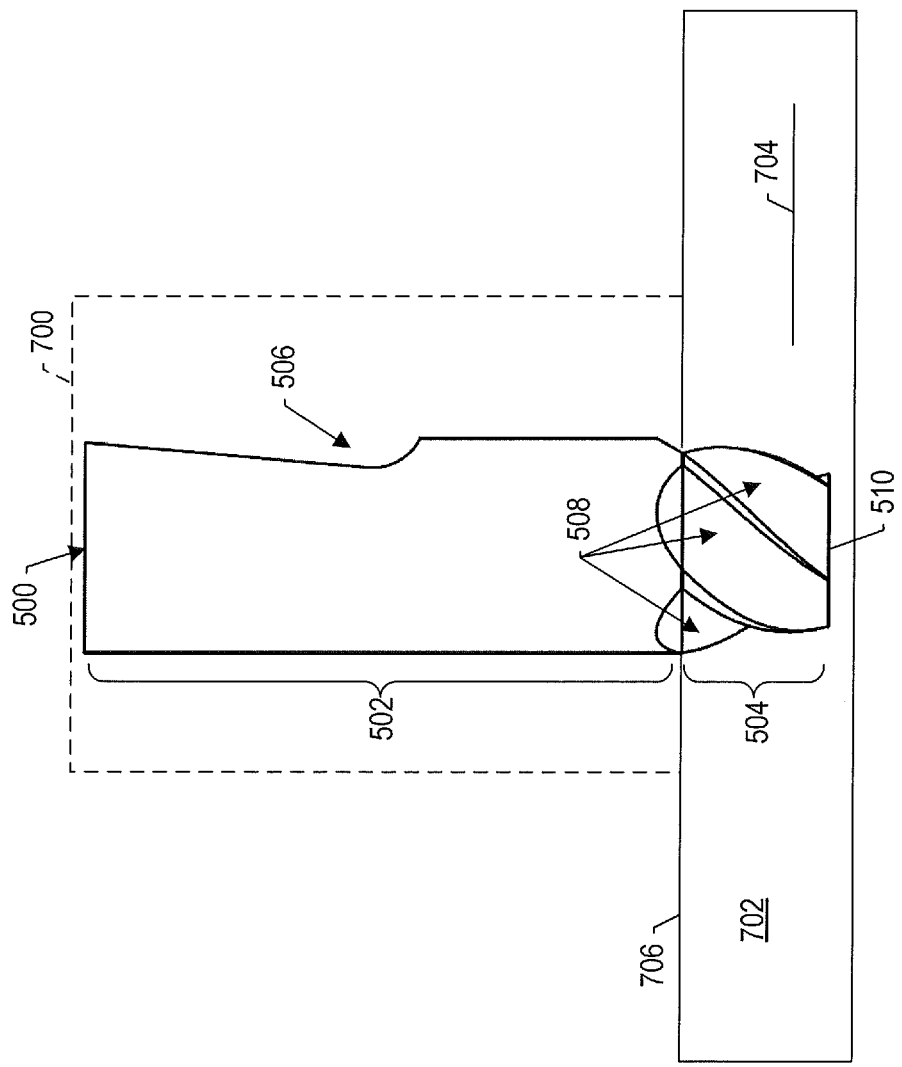
FIG. 7 illustrates an instance in which the mandrel tool probe of FIG. 3 is oriented normal to a workpiece for performance of a FSW process.

FIG. 7 illustrates an instance in which the mandrel tool probe 500 (as part of a FSW tool including a support body 700) is oriented normal to a workpiece 702 for performance of a FSW process. In one example, the length of the probe tip may be entirely or nearly entirely extended into the workpiece with, in one example, only the transition of the spiraled surfaces 508 extending into the body. In accordance with example embodiments, in any cross-section of the tool tip 504, the major segments 516 may be coplanar lying in a plane 704 that is parallel to a surface 706 of the workpiece. In one example, the major segments (cross-sections of spiraled surfaces) of each cross-section of the tool tip along its length may be coplanar lying in a plane that is normal to the probe axis 514. As such, the major segment of one example may represent the shortest distance that material in the workpiece may travel in its original plane when passing across the face of each spiraled surface 508 in the set of spiraled surfaces during a FSW process.

As also shown in FIG. 7, the sides formed by the spiraled surfaces 508 may provide a straight material flow path along the tool surface located within the same plane 704 of the workpiece 702 in which the material was originally located within the workpiece. In addition, the spiral inclination of the spiraled surface may provide some degree of metal shearing along the length of the probe 500 to help reduce drag force.

As indicated above, the number of spiraled surfaces 508 may be selected in a number of different manners, such as to optimize the overall FSW process. Likewise, the probe tip 504 may have a cross-section shape that depends on the number of spiraled surfaces. FIG. 8 generally illustrates a triangular cross-section 800, rectangular cross-section 802, pentagonal cross-section 804, hexagonal cross-section 806 and heptagonal cross-section 808 of various example probe tips, including the core and swept diameters 810, 812 of the respective probe tips. As shown, selecting different numbers of spiraled surfaces may affect features of the probe. For example, increasing the number of spiraled surfaces may reduce the cavity 814 produced by the presence of the spiraled surfaces around the circumference (periphery) of the probe, which may therefore lower the chip load each spiraled surface may carry per revolution. Increasing the number of spiraled surfaces may also increase the core diameter 810 of the probe relative to its swept diameter 812, which may make the probe less susceptible to breakage. Too many spiraled surfaces, however, may cause the probe to resemble a circular probe, which may reduce the amount of material that may be revolved around the probe in the cavity per revolution. Too few spiraled surfaces may reduce the core diameter, while increasing the chip load per spiraled surface by increasing the cavity, which may weaken and overload the probe and thereby increase its susceptibility to breakage.

Parameters of the mandrel tool probe 500 may vary according to application, such as to address unique material flow characteristics of different alloys and material products. For example, the probe tip 504 may be extended in length to weld thicker materials. Extending the length of the probe tip, however, may require increasing the size of the probe to maintain the proportions of the probe features, such as to minimize the risk of tool breakage. In this regard, extending the tip length may require increasing the size of the probe to maintain the ratio of the diameter of the probe shank 502 to the length of the probe tip, while maintaining the local taper angle β. In one example, the cross-section of the spiraled surfaces 508 may also be maintained while lengthening the probe, thereby avoiding incomplete stirring (and ensuring proper stirring) of the joint material.

As explained above and in the example embodiment of FIGS. 5-7, the spiraled surfaces 508 in the set of spiraled surfaces may have a linear cross-section. In other examples, each spiraled surface may have a curved cross-section that deviates from being linear, having either a radiused convex or concave shape.

When viewed along or in the direction of a given spiraled flat in the set of spiraled surfaces 508, the flat may appear concave (dished) similar to a groove or channel However, this geometrical appearance results from the manner of defining the geometry of the flats based on the major segments 516 in a cross-section normal to the probe axis 514.

FIGS. 9 and 10 illustrate other examples in which the spiraled surfaces have a curved shape. In FIG. 9, the cross-section of the tip 900 includes radiused convex major segments 902, with minor segments 904 therebetween. Similarly, in FIG. 10, the cross-section of the tip 1000 includes radiused concave major segments 1002, with minor segments 1004 therebetween. If one considers the curved major segment as being defined by a chord 906, 1006 representing a corresponding linear major segment (having a length l), the chord may have a height d. The amount of the major segment's deviation from linear, which may be by as much as 10% or more, may be measured in terms of an aspect ratio of the chord height to chord length (d/l). In one example, d is small enough to ensure that the spiraled surfaces do not bulge beyond the diameter of the probe, such as in the case of a d less than or equal to half the distance from the core diameter 520 to the swept diameter 522. Thus, although example embodiments may at times be described in terms of flat spiraled surfaces, example embodiments may be equally applicable to curved spiraled surfaces.

In one example, a chamfer may be machined into the tip of the probe. FIG. 11a illustrates the probe 500 of FIGS. 5-7 indicating a chamfer 1100 that may be machined into its tip 504, and FIG. 11b illustrates another example probe 1102 similar to that of FIGS. 5-7 but including the chamfer 1100 machined into its end. In this example, the probe may still have a cross-section with a constant shape along the length of the tip, and more particularly along the length of its tip from the chamfer to the shank 502 (or to any blend or transition in the spiraled surfaces 508 leading up to the shank).

As also explained above, in some example embodiments, the land areas 512 between adjacent spiraled surfaces 508 may include intermediate geometric features such as tapered flats, neutral, spiraling or counter-spiraling channels, or the like, at least some examples of which are described in the aforementioned '306 patent. FIG. 12 illustrates one example embodiment of a mandrel tool probe 1200 similar to the tool probe 500 of FIGS. 5-7 but including counter-spiraling channels 1202 between adjacent spiraled surfaces 508. Likewise, FIG. 13 illustrates one example embodiment of a chamfered mandrel tool probe 1300 similar to the tool probe 1102 of FIG. 11b but including counter-spiraling channels between adjacent spiraled surfaces. These counter-spiraling channels may reduce the drag force on the probe during a FSW operation. The counter-spiraling channels may act to allow workpiece material to pass inside a swept volume of the spinning probe, which may tend to bleed off pressure on the probe and improve local mixing along its length. The counter-spiraling channels may also tend to act opposite threads 108 in that they shunt workpiece material toward the tool shoulder without shredding the material. The use of such channels may therefore not be intended to replace threads, but instead to promote better flow of material without creating the multiple material interfaces that threads tend to produce.

Additionally or alternatively, the tool probe may be part of a FSW tool including one or more secondary features. In one example, the shoulder of the FSW tool may be machined to include a scroll pattern that may extend to its edge or boundary. In another example, the scroll pattern may terminate prior to its edge or boundary to create a scroll-free concentric surface area on the shoulder. FIG. 14 illustrates an example single-piece FSW tool 1400 similar to the tool 300 of FIG. 3 but including a chamfered mandrel tool probe 1102 and a shoulder 304 including a scroll pattern 1400. Similarly, FIG. 15 illustrates an example multi-piece FSW tool 1500 similar to the tool 400 of FIG. 4 but including the chamfered mandrel tool probe 1102 and shoulder 404 including the scroll pattern. Example scroll patterns include single or multiple logarithmic spirals, Archimedean spirals, Golden Section spirals, wobbly spirals, concentric grooves, and the like. The scroll patterns may also include grooves that are generally oblique to the spirals or grooves and extend in a generally radial direction relative to the pin.

As shown in FIGS. 14 and 15, the scroll pattern 1400 may terminate before the outer boundary of the shoulder section, which may thereby define a concentric peripheral surface area 1402 adjacent to the scroll pattern that is free of scrolls.

More particularly, for example, the scroll pattern may extend from the probe 1102 and terminate prior to the peripheral boundary of the shoulder to define a peripheral scroll-free concentric region on the face of the shoulder. The scroll-free concentric region may be concentric about the probe axis, and extend from the scroll pattern and terminate at the peripheral boundary of the shoulder. In one example, the scroll-free concentric region may cover at least 5% of the total surface area of the face of the shoulder. And in one example, the scroll pattern may include a plurality of spiral-formed grooves each of which spirals outward for less than a full revolution around the shoulder. For more information regarding this feature, see U.S. Pat. No. 8,016,179 to Burford, the content of which is hereby incorporated by reference in its entirety.

Figure 16:
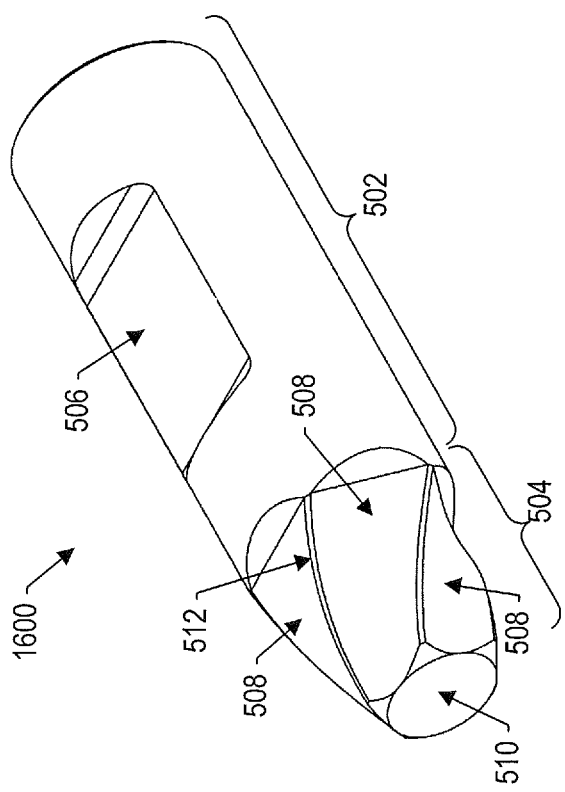
Figure 17:
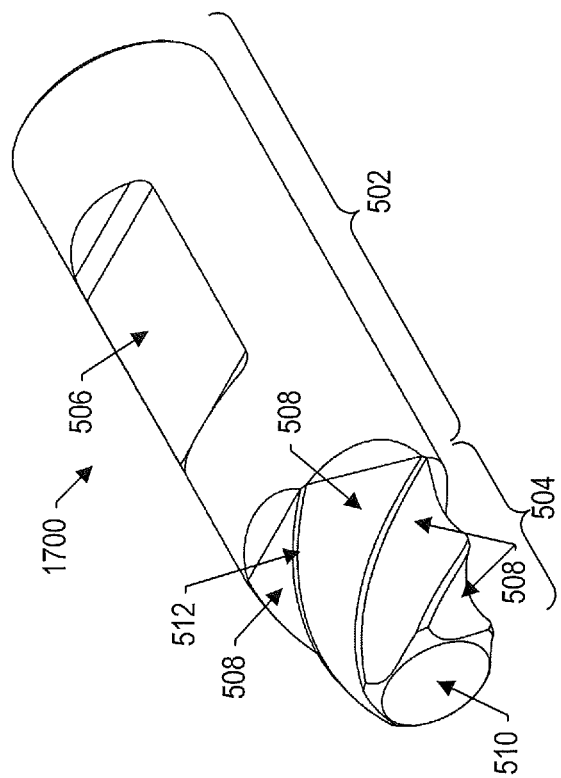
Figure 18:
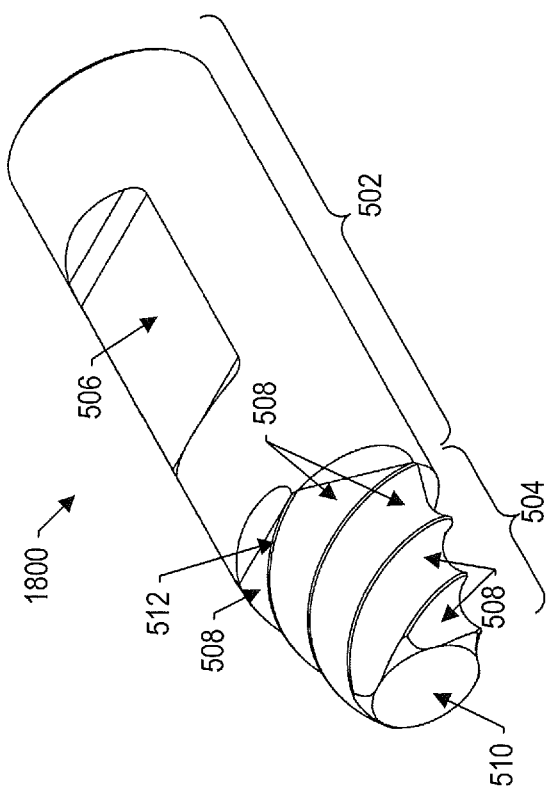

To further illustrate various example embodiments of the mandrel tool probe, reference is now made to FIGS. 16-25. FIG. 16 illustrates an example mandrel tool probe 1600 including five spiraled surfaces 508 having a spiral angle α of approximately 30 degrees. FIG. 17 illustrates an example mandrel tool probe 1700 including five spiraled surfaces having a spiral angle α of approximately 45 degrees. And FIG. 18 illustrates an example mandrel tool probe 1800 including five spiraled surfaces 508 having a spiral angle α of approximately 60 degrees.

Figure 19:
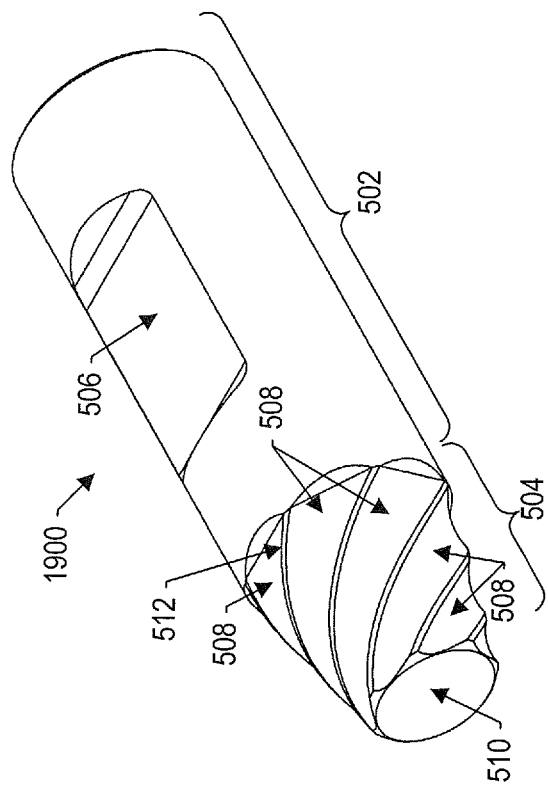
Figure 21:
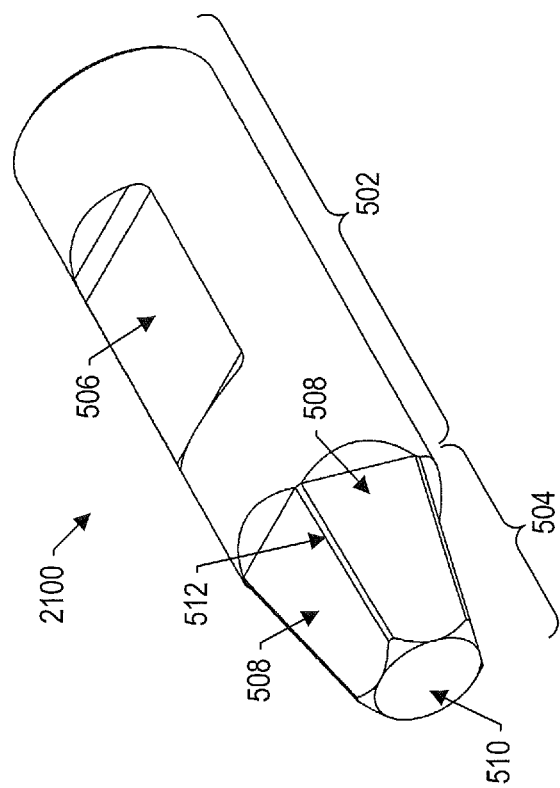
Figure 20:
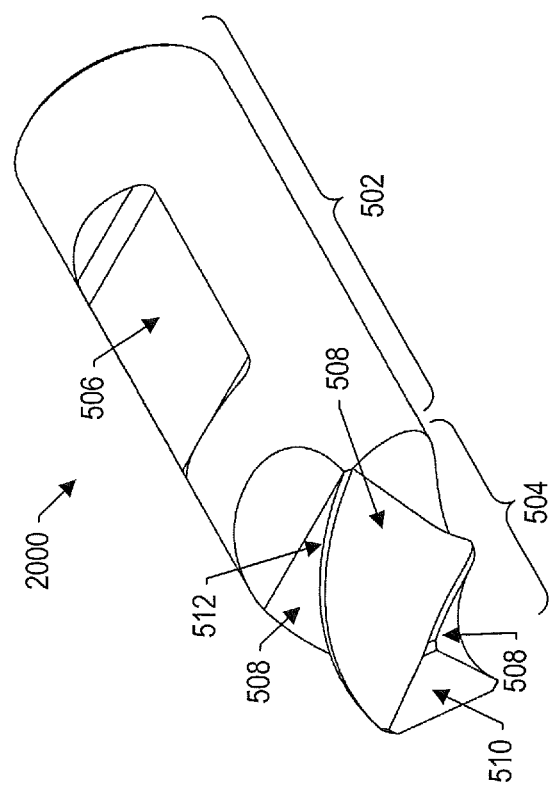

FIG. 19 illustrates an example mandrel tool probe 1900 including seven spiraled surfaces 508 having a spiral angle a of approximately 45 degrees. FIG. 20 illustrates an example mandrel tool probe 2000 including three spiraled surfaces 508 having a spiral angle α of approximately 45 degrees. FIG. 21 illustrates an example mandrel tool probe 2100 including five spiraled surfaces 508 having a spiral angle α of approximately 0 degrees, which may thereby define straight surfaces instead of spiraled surfaces.

Figure 23:
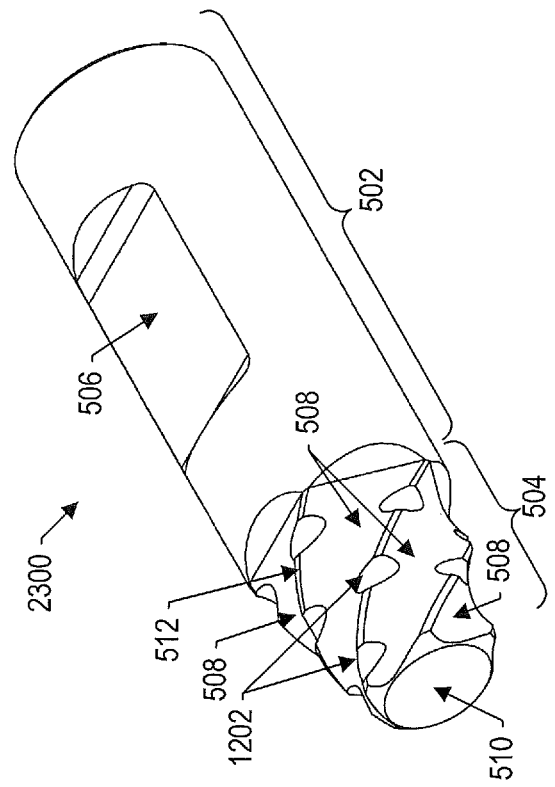
Figure 22:
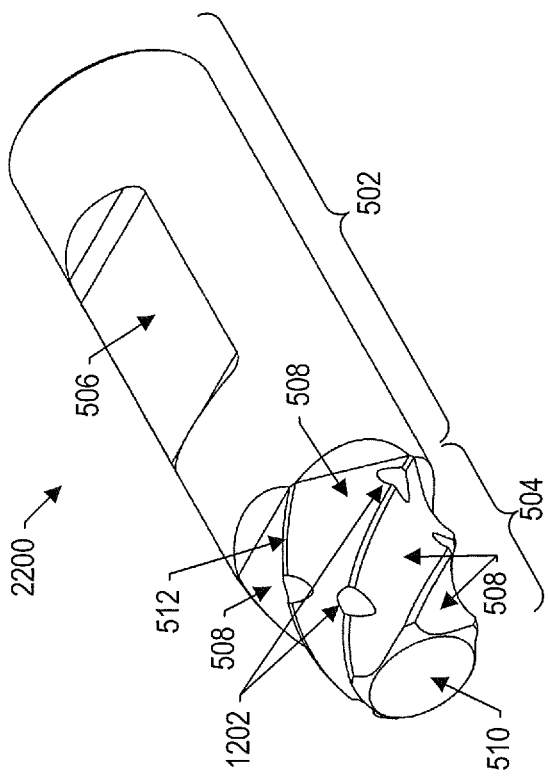
Figure 24:
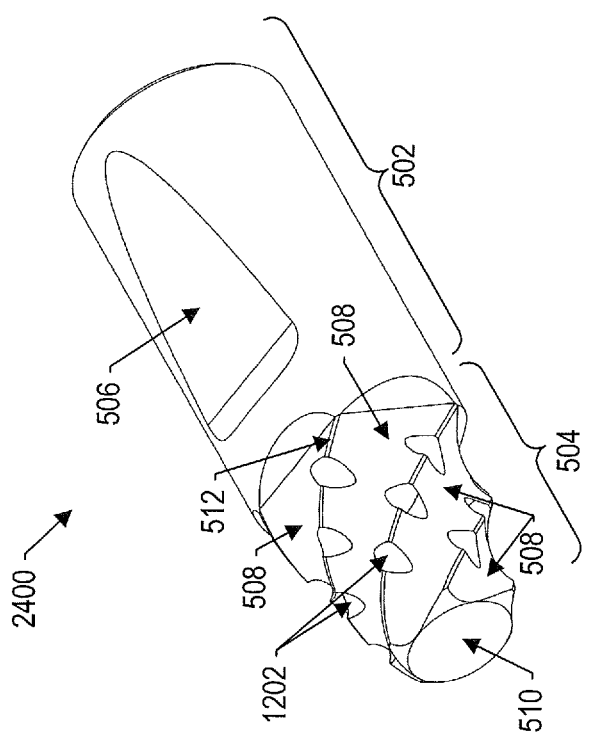

FIG. 22 illustrates an example mandrel tool probe 2200 similar to that of FIG. 17 but further including a set of three counter-spiraling channels 1202 having a spiral angle α of approximately 45 degrees. FIG. 23 illustrates an example mandrel tool probe 2300 including a single counter-spiraling channel 1202 having a spiral angle α of approximately 10 degrees. And FIG. 24 illustrates an example mandrel tool probe 2400 including a set of seven counter-spiraling channels 1202 having a spiral angle α of approximately 45 degrees.

In accordance with example embodiments of the present disclosure, a set of spiraled surfaces 508 may affect material flow in a substantially different way than threads 108. For a FSW tool including the mandrel tool probe 500, the set of spiraled surfaces effectively promotes material flow from in front of the rotating tool probe to behind the tool with lower material turbulence and a less aggressive spiraling action otherwise caused by threads. By design, the spiraled surfaces may alone reduce if not eliminate the shredding effect caused by threaded probes. The mandrel tool probe of example embodiments may promote a mandrel effect in contrast to the spiraling, augering effect of threads. A thread 108 is a helical geometric feature that is typically used to convert rotational movement into linear movement. In the case of FSW, this behavior or trait of threads means that a probe equipped with threads tends to move or auger joint material along the length of the probe away from the shoulder. Further, joint material contained in the threads may be sheared or divided from material just outside the reach of the threads. This combined action may form a complex flow path for the joint material around the tool. Combined with flats 110, a threaded probe 100 may create an even more complex flow path for the joint material by breaking up the flow of the material within the threads. Another complicating factor with screw threads is that small portions of the threads may break off in the joint with use, causing contamination of or inclusions in the joint.

In contrast to threads, a set of spiraled surfaces 508 may provide a much simpler or less complex flow path around the spinning, rotating probe. The probe may present a straight tool path (major segment 516) to the joint material along each spiraled surface. In this way, a set of spiraled surfaces may allow the joint material to move around the periphery of the rotating, advancing probe body or profile by not forcing the material to move along the probe as do threads 108. In one example, spiraled surfaces may also provide an additional flow path at an angle that is favorable to metal deformation by shear, nominally 45 degrees, which is nominally the orientation of maximum shear stress to the principal loading axis applied by the rotary, advancing motion of the probe. Further, a set of spiraled surfaces may not incorporate protrusions like threads that may break off of the probe and end up in the workpiece joint.

Grooves are also more aggressive than spiraled surfaces 508. Grooves are sometimes (but not always) used in conjunction with threads 108, and tend to accelerate the action of threads by primarily working to move material rapidly along the length of the probe, possibly at a faster rate than do threads. The grooves' action may involve scooping material into their cavity and then moving or transporting the material toward the end of the probe tip.

Here again, spiraled surfaces 508 may operate in a substantially different manner since they are not dished in the plane 704 of the workpiece material. While grooves are dished and therefore tend to capture and contain joint material within their depth, a probe 500 with spiraled surfaces ideally allows the material to flow across the face of the spiraled surfaces along a straight path while staying in the same plane. In summary, a set of spiraled surfaces may be designed to move workpiece material around and back of the tool in an efficient manner with minimal auger effect that threads impose on material flow around a rotating weld tool probe, as opposed to move workpiece material in mass transit along the probe length as do threads 108 and grooves.

Some example embodiments of the mandrel tool probe 500 may promote material flow in a friction stir welding joint without the assistance of threads, grooves, channels or the like. FIG. 25 presents a comparison between two metallographic cross-sections of joints produced by friction stir welding in a 0.25 inch thick AA7000 series aluminum alloy. The first (top) cross-section is from a weld produced by the conventional threaded tool probe such as that shown in FIG. 1. The second (bottom) was produced by the mandrel tool probe such as that shown in FIG. 5, which is nominally the same size.

As shown in FIG. 25, it may be observed that the stir zone produced by the mandrel tool probe 500 is broader throughout, especially near the bottom of the weld. As a result of the wider, squarer nugget, the mandrel tool probe may be less sensitive to lateral offset (difference between the weld tool line and the butt joint line) for a given probe diameter. Also, spindle torque measurements may indicate that some example embodiments of the mandrel tool probe may require less torque than the conventional threaded tool probe 100. In addition to producing a better nugget shape and size, the mandrel tool probe may reduce the production of shredded chips (i.e., interfaces), and may thus appear to promote better consolidation of material in the nugget.

Some example embodiments of the mandrel tool probe 500 have also been found to produce better mixing in the nugget. FIGS. 26 and 27 provide a comparison between metallographic cross-sections produced by the tools shown in FIGS.

1 and 5, respectively. The material joined, a 0.25 inch thick AA7000 aluminum extrusion, had a large recrystallized surface grain, which, in effect, acted as a marker revealing the degree of mixing caused by each tool. The cross-section in FIG. 26 is from a weld produced by the threaded tool probe 100. The cross-sections in FIG. 27 are from welds produced by a mandrel tool probe at 240 rpm and 10 ipm (top), and at 280 rpm and 8 ipm (bottom), respectively. In FIG. 27, the large recrystallized surface grain is shown to be almost completely mixed within the stir zone of the welds produced.

From a comparison of FIGS. 26 and 27, it may be observed that some example embodiments of the mandrel tool probe may promote better mixing, in that the large recrystallized surface grain may appear more broken up and is less pronounced after friction stir welding. Similar to the results shown in FIG. 25, the stir zone produced by the mandrel tool probe may be wider in size to the stir zone produced by the threaded tool probe 100. One implication of this result may be that a mandrel tool probe with a smaller diameter may be used to produce a comparable stir zone of a threaded tool probe, and may thus require a lower drag force. The weld zone produced by the mandrel tool probe, when compared to the threaded tool probe, may be broader and squarer than that produced by the threaded tool probe of the same diameter. These stir zone characteristics may be expected to produce enhanced FSW and FSP properties. Unlike threaded tool probes, it may also be anticipated that the mandrel tool probe may endure over long production runs and lengths without shedding tool material from the probe into the weld joint as may the threaded tool probe.

Examination of the microstructures of stir zones produced by threaded tool probes 100 may reveal an appearance of compacted metal chips. While the material shredded or stripped by the action of the tool probe threads may be recombined, evidence of their prior surface interfaces may be visible in the microstructure of the weld. In such instances, once shredded or stripped by the action of the probe threads, the chips formed by this action must be reconsolidated by the forging force/action of the weld tool in the welding process. As a result, there may be a potential for internal defects to be present that are not detectible by any nondestructive method. Because some example embodiments of the mandrel tool probe appear to work the material much less than the threaded tool probe 100, the mandrel tool probe may be expected to reduce the internal surface interfaces otherwise produced by the threaded tool probe. While threads tend to shear the stirred material in the vertical direction, the mandrel effect of the non-threaded style probe tends to direct the material around and along the pin with much less severity than to the shredding or stripping effect of the threads.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A mandrel tool probe for performing a friction-stir process, the probe comprising:
   a shank having a cylindrical shape; and
   a tip coupled to the shank and free of threads, the shank and tip being concentric and rotatable about a given axis, the tip having a cross-section that defines an inscribing circle with a core diameter, and a concentric circumscribing circle with a swept diameter greater than the core diameter,
   wherein the tip includes a set of a plurality of physically-separate, spiraled surfaces separated by land areas between adjacent spiraled surfaces, each of the spiraled surfaces and land areas extending along a length of the tip at a spiral angle around the circumference of the tip,
   wherein the tip has a cross-section with a constant shape along the length of the tip, the cross-section of the tip including a plurality of major segments interconnected via minor segments, each of the major segments being formed of a respective spiraled surface, and each of the minor segments being formed of a respective land area and having a length that is less than 10% of the length of each of the major segments, and
   wherein each major segment is linear or deviates from linear with a height at its apex of no more than half the distance from the core diameter to the swept diameter, a chord of the circumscribing circle that shares endpoints with the major segment being tangent to the inscribing circle.

2. The mandrel tool probe of claim 1, wherein the set of spiraled surfaces includes between three and nine spiraled surfaces.

3. The mandrel tool probe of claim 1, wherein the major segments of each cross-section of the tip along the length of the tip are coplanar in a plane that is normal to the given axis.

4. The mandrel tool probe of claim 1, wherein the major segments of any cross-section of the tip along the length of the tip have the same or approximately the same length.

5. The mandrel tool probe of claim 4, wherein the major segments from one cross-section of the tip to another cross-section of the tip along the length of the tip have varying lengths.

6. The mandrel tool probe of claim 1, wherein the tip is tapered, and a size of the cross-section of the tip varies along the length of the tip based on the taper.

7. The mandrel tool probe of claim 1, wherein the spiraled surfaces are separated by land areas between adjacent spiraled surfaces, the land areas including intermediate geometric features that include at least one of tapered flats, or counter-spiraling channels.

8. A tool for performing a friction-stir process, the tool comprising:
   a support body having a shoulder at its distal end; and
   a probe extending outwardly from the shoulder and free of threads, the support body, shoulder and probe being concentric and rotatable about a given axis, the probe having a cross-section that defines an inscribing circle with a core diameter, and a concentric circumscribing circle with a swept diameter greater than the core diameter,
   wherein the probe includes a set of a plurality of physically-separate, spiraled surfaces separated by land areas between adjacent spiraled surfaces, each of the spiraled surfaces and land areas extending along a length of the probe at a spiral angle around the circumference of the probe, wherein the probe has a cross-section with a constant shape along the length of the probe, the cross-section of the probe including a plurality of major segments interconnected via minor segments, each of the major segments being formed of a respective spiraled surface, and each of the minor segments being formed of a respective land area and having a length that is less than 10% of the length of each of the major segments, and wherein each major segment is linear or deviates from linear with a height at its apex of no more than half the distance from the core diameter to the swept diameter, a chord of the circumscribing circle that shares endpoints with the major segment being tangent to the inscribing circle.

9. The tool of claim 8, wherein the set of spiraled surfaces includes between three and nine spiraled surfaces.

10. The tool of claim 8, wherein the major segments of each cross-section of the probe along the length of the probe are coplanar in a plane that is normal to the given axis.

11. The tool of claim 8, wherein the major segments of any cross-section of the probe along the length of the probe have the same or approximately the same length.

12. The tool of claim 11, wherein the major segments from one cross-section of the probe to another cross-section of the probe along the length of the probe have varying lengths.

13. The tool of claim 8, wherein the probe is tapered, and a size of the cross-section of the probe varies along the length of the probe based on the taper.

14. The tool of claim 8, wherein the spiraled surfaces are separated by land areas between adjacent spiraled surfaces, the land areas including intermediate geometric features that include at least one of tapered flats, or counter-spiraling channels.

15. The tool of claim 8, wherein the probe includes a shank and a tip coupled to the shank, the shank being held in the support body, and the tip extending outwardly from the shoulder and including the set of spiraled surfaces.

16. The tool of claim 8, wherein the support body and probe are integral with one another.

17. A method of improving the tool life and efficiency of a non-consumable tool probe for friction-stir processing (FSP) or friction-stir welding (FSW) operations, the method comprising:

rotating and orienting the probe normal to a surface of workpiece or plurality of workpieces; and as the probe rotates, plunging the rotating probe into workpiece or plurality of workpieces; and forming by the rotating probe, a refined and modified microstructure of the workpiece through a FSP operation, or a permanent joint between the plurality of workpieces through a FSW operation, wherein the probe comprises:

a shank having a cylindrical shape; and a tip coupled to the shank and free of threads, the shank and tip being concentric and rotatable about a given axis, the tip having a cross-section that defines an inscribing circle with a core diameter, and a concentric circumscribing circle with a swept diameter greater than the core diameter, wherein the tip includes a set of a plurality of physically-separate, spiraled surfaces separated by land areas between adjacent spiraled surfaces, each of the spiraled surfaces and land areas extending along a length of the tip at a spiral angle around the circumference of the tip, wherein the tip has a cross-section with a constant shape along the length of the tip, the cross-section of the tip including a plurality of major segments interconnected via minor segments, each of the major segments being formed of a respective spiraled surface, and each of the minor segments being formed of a respective land area and having a length that is less than 10% of the length of each of the major segments, and wherein each major segment is linear or deviates from linear with a height at its apex of no more than half the distance from the core diameter to the swept diameter, a chord of the circumscribing circle that shares endpoints with the major segment being tangent to the inscribing circle.

18. The method of claim 17, wherein during the FSP operation or FSW operation, and within each plane in the workpiece or plurality of workpieces that is normal to the surface thereof, a straight material flow path is presented between the land areas.

19. The method of claim 17, wherein rotating the probe comprises rotating the probe including the spiraled surfaces separated by land areas between adjacent spiraled surfaces, the land areas including intermediate geometric features that include at least one of tapered flats, or counter-spiraling channels.

* * * * *